(12) United States Patent
Kagawa et al.

(10) Patent No.: US 10,940,618 B2
(45) Date of Patent: Mar. 9, 2021

(54) APPARATUS FOR PRODUCING MICROPOROUS PLASTIC FILM

(71) Applicants: Seiji Kagawa, Koshigaya (JP); Atsuko Kagawa, Koshigaya (JP)

(72) Inventors: Seiji Kagawa, Koshigaya (JP); Yoichiro Kagawa, Koshigaya (JP)

(73) Assignees: Seiji Kagawa, Koshigaya (JP); Atsuko Kagawa, Koshigaya (JP)

( * ) Notice: Subject to any disclaimer, the term of this patent is extended or adjusted under 35 U.S.C. 154(b) by 260 days.

(21) Appl. No.: 15/492,332

(22) Filed: Apr. 20, 2017

(65) Prior Publication Data
US 2017/0368725 A1 Dec. 28, 2017

(30) Foreign Application Priority Data
Jun. 24, 2016 (JP) .............................. JP2016-125827

(51) Int. Cl.
| | | |
|---|---|---|
| B29C 43/24 | (2006.01) | |
| B26F 1/20 | (2006.01) | |
| B26D 7/26 | (2006.01) | |
| B29L 7/00 | (2006.01) | |

(52) U.S. Cl.
CPC ............ B29C 43/245 (2013.01); B26D 7/265 (2013.01); B26F 1/20 (2013.01); *B26D 2007/2692* (2013.01); *B29L 2007/00* (2013.01)

(58) Field of Classification Search
None
See application file for complete search history.

(56) References Cited

U.S. PATENT DOCUMENTS

| | | | | |
|---|---|---|---|---|
| 3,273,199 A | * | 9/1966 | Kleinewefers | ....... B01D 35/005 100/158 C |
| 5,352,108 A | | 10/1994 | Kagawa et al. | |
| 5,451,257 A | | 9/1995 | Kagawa et al. | |
| 5,648,107 A | * | 7/1997 | Kagawa | .................... B26F 1/24 264/284 |

FOREIGN PATENT DOCUMENTS

| | | |
|---|---|---|
| JP | 6-71598 A | 3/1994 |
| JP | 6-328483 A | 11/1994 |
| JP | 2002-59487 A | 2/2002 |
| JP | 5926437 B1 | 5/2016 |

OTHER PUBLICATIONS

Notice of Reasons for Rejection for corresponding Japanese Patent Application No. 2016-125827 dated Oct. 4, 2016.

* cited by examiner

*Primary Examiner* — Marc C Howell
*Assistant Examiner* — Asha A Thomas
(74) *Attorney, Agent, or Firm* — Birch, Stewart, Kolasch & Birch, LLP

(57) ABSTRACT

An apparatus for producing a microporous plastic film comprising a pattern roll having large numbers of high-hardness, fine particles; an anvil roll opposing the pattern roll; a conveying means for passing a plastic film through a gap of both rolls; a stationary frame rotatably supporting one of both rolls; a pair of laterally arranged movable frames rotatably supporting the other roll; and a pair of laterally arranged carriages to each of which each of the movable frames is fixed; at least one of the carriages moving in a running direction of the plastic film to generate positional difference between a pair of the movable frames, so that the center axes of both rolls are relatively inclined to each other.

10 Claims, 23 Drawing Sheets

APPARATUS FOR PRODUCING MICROPOROUS PLASTIC FILM

FIELD OF THE INVENTION

The present invention relates to an apparatus for precisely producing a microporous plastic film having high gas permeability and moisture permeability.

BACKGROUND OF THE INVENTION

Breads, cookies, vegetables, fermented foods such as fermented soybeans and kimchi, etc. have been conventionally sold in a state wrapped in paper or plastic bags. Though paper bags have high gas permeability and moisture permeability, they are disadvantageous in not permitting their contents to be seen. On the other hand, plastic bags permit contents to be seen, but they are disadvantageous in not having sufficient gas permeability and moisture permeability, and extremely deteriorating the flavor and texture of foods.

To obtain a plastic film permitting contents to be well seen, while having high gas permeability and moisture permeability, apparatuses for forming large numbers of fine pores in a plastic film are known. For example, JP 6-71598 A discloses an apparatus for producing a microporous film comprising a means for supplying a long plastic film, a first roll (pattern roll) having large numbers of fine particles having sharp edges and Mohs hardness of 5 or more fixed to its rolling surface, a second roll (metal roll) having a flat rolling surface and rotatable in an opposite direction to that of the first roll, a pressure-adjusting means disposed near both ends of either one roll for adjusting a pushing force to a long plastic film, and a means for applying high voltage to the first roll, either one or both of the first and second rolls being movable in their arrangement direction. The first and second rolls are arranged in parallel, and a long plastic film passing through a gap therebetween is provided with large numbers of fine pores by large numbers of fine particles of the first roll.

However, when large numbers of fine pores are formed in a plastic film (not shown) as thick as about 8-100 µm passing through a gap between a pattern roll 1 and an anvil roll (metal roll) 2, a large load F is applied to the pattern roll 1 and the metal roll 2, so that both rolls 1, 2 tend to be bent, resulting in a wider gap in a center portion, as shown in FIG. 26(*a*) and FIG. 26(*b*). It has been attempted to arrange backup rolls above the pattern roll 1 and/or below the metal roll 2, to reduce the bending of the pattern roll 1 and the metal roll 2. However, because large numbers of fine particles are fixed to a rolling surface of the pattern roll 1, soft-surface rubber rolls, etc. should be used as the backup rolls, failing to sufficiently prevent the bending of the pattern roll 1 and the metal roll 2.

OBJECT OF THE INVENTION

Accordingly, an object of the present invention is to provide an apparatus capable of forming large numbers of fine pores in a plastic film precisely and efficiently, while preventing troubles due to the bending of a pattern roll and a metal roll.

SUMMARY OF THE INVENTION

As a result of intensive research in view of the above object, the inventor has found that (a) with a pattern roll 1 and an anvil roll 2 both bent by pressing a plastic film (not shown) being inclined to each other by a small angle θ as shown in FIGS. 1(*a*) and 1(*b*), their linear contact pressure is uniform along their center axes, so that large numbers of fine pores can be formed in a wide plastic film uniformly in a width direction; and (b) with either one of the pattern roll 1 and the anvil roll 2 rotatably supported by a stationary frame, and the other rotatably supported by a pair of laterally arranged movable frames, the movable frames being movable relative to the stationary frame, the relative inclination of a center axis of the anvil roll 2 to a center axis of the pattern roll 1 can be precisely controlled. The present invention has been completed based on such findings.

Thus, the apparatus of the present invention for producing a microporous plastic film comprises
 a pattern roll randomly having large numbers of high-hardness, fine particles having sharp edges on a rolling surface of a roll body;
 an anvil roll arranged opposite to the pattern roll;
 a conveying means for passing a plastic film through a gap between the pattern roll and the anvil roll;
 a stationary frame rotatably supporting either one of the pattern roll and the anvil roll;
 a pair of laterally arranged movable frames rotatably supporting the other of the pattern roll and the anvil roll; and
 a pair of laterally arranged carriages, to each of which each of the movable frames is fixed;
 at least one of the carriages moving in a running direction of the plastic film, to generate positional difference between a pair of the laterally arranged movable frames in a running direction of the plastic film, so that a center axis of the pattern roll and a center axis of the anvil roll are relatively inclined to each other.

In the apparatus of the present invention for producing a microporous plastic film, the carriages are preferably independently movable back and forth along a pair of rails extending in a running direction of the plastic film.

When the pattern roll is rotatably supported by the stationary frame, and the anvil roll is rotatably supported by a pair of the laterally arranged movable frames, the apparatus of the present invention for producing a microporous plastic film preferably comprises
 a pair of first driving means for moving the carriages independently;
 a second driving means for rotating the pattern roll;
 a third driving means for rotating the anvil roll; and
 a pair of fourth driving means each mounted to each of the carriages for moving the anvil roll up and down along the movable frame.

In the apparatus of the present invention for producing a microporous plastic film, the second and third driving means are preferably driven by one motor via gears having the same number of teeth, thereby rotating the pattern roll and the anvil roll at the same rotation speed.

The apparatus of the present invention for producing a microporous plastic film preferably further comprises
 a strain-removing roll brought into contact with a plastic film provided with large numbers of fine pores (perforated plastic film), and a pair of fifth driving means for changing the heights of bearings rotatably supporting both ends of the strain-removing roll, at a position downstream of a gap between the pattern roll and the anvil roll;
 at least one of the fifth driving means being operated to move at least one end of the strain-removing roll, thereby vertically inclining the strain-removing roll relative to the perforated plastic film, to absorb strain generated in the perforated plastic film by the inclination of the center axis of the anvil roll to the center axis of the pattern roll.

In the apparatus of the present invention for producing a microporous plastic film, the high-hardness, fine particles preferably have Mohs hardness of 5 or more.

In the apparatus of the present invention for producing a microporous plastic film, the anvil roll is preferably a metal roll having a flat rolling surface, or a metal roll randomly having on its rolling surface large numbers of recesses having an opening diameter distribution and a depth distribution corresponding to those of the high-hardness, fine particles.

In the apparatus of the present invention for producing a microporous plastic film, the area ratio of the high-hardness, fine particles on a rolling surface of the pattern roll is preferably 10-70%.

In the apparatus of the present invention for producing a microporous plastic film, the anvil roll is preferably a metal roll randomly having on its rolling surface large numbers of recesses having an opening diameter distribution and a depth distribution corresponding to those of the high-hardness, fine particles; an area ratio of the recesses on a rolling surface of the anvil roll being 10-70%.

The apparatus of the present invention for producing a microporous plastic film preferably further comprises a means for adjusting a gap between the pattern roll and the anvil roll; so that a pushing force to the plastic film is adjusted in a range of 0.002-1.47 kN/cm (0.2-150 kgf/cm) by linear pressure.

DESCRIPTION OF THE PREFERRED EMBODIMENTS

The embodiments of the present invention will be explained in detail below referring to the attached drawings.

Explanations of each embodiment are applicable to other embodiments unless otherwise mentioned. Explanations below are not restrictive, but various modifications may be made within the scope of the present invention.

[1] First Embodiment

Figure 2A:
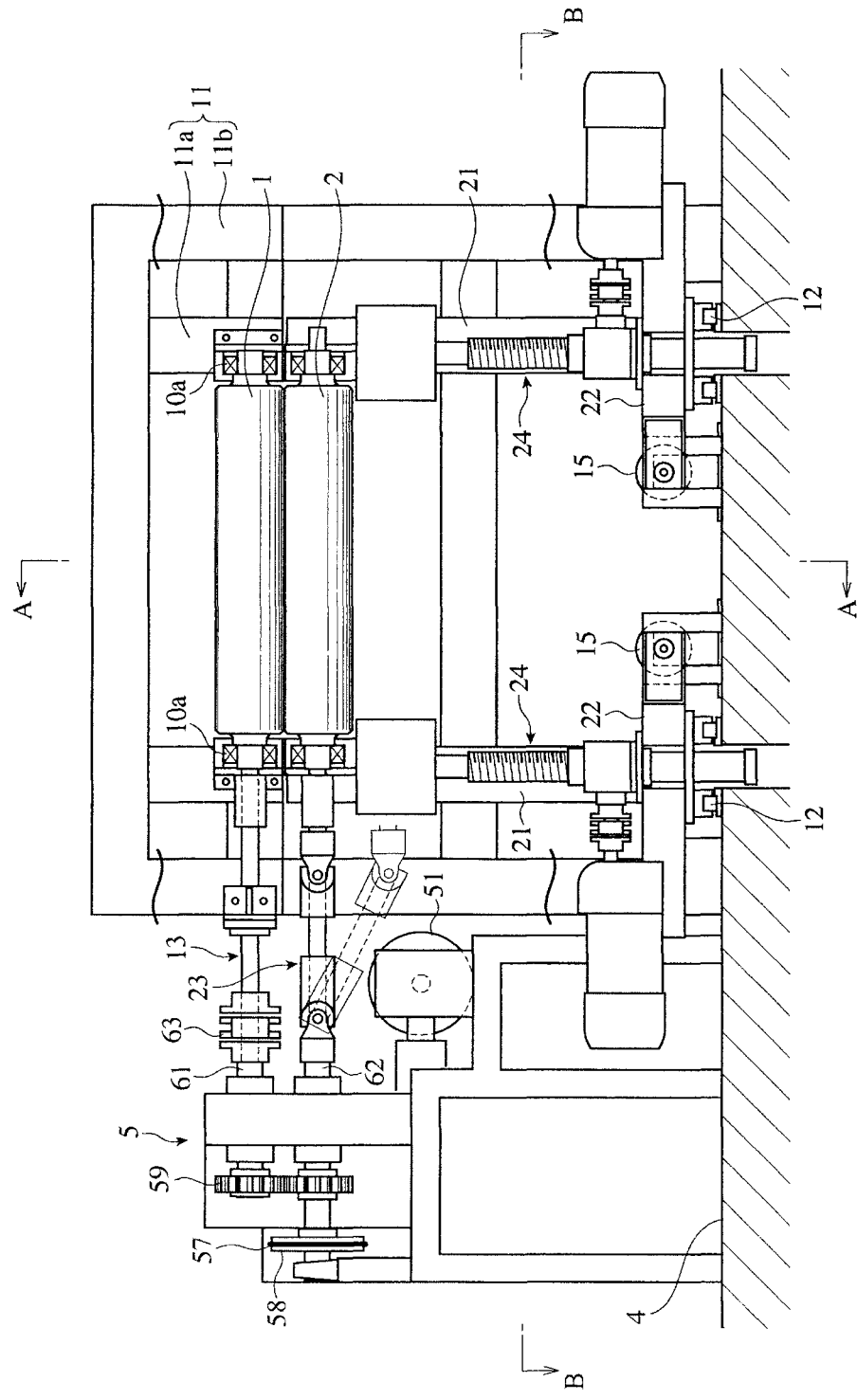
FIG. 2(a) is a front view showing the production apparatus of a microporous plastic film according to the first embodiment of the present invention, with a reduced gap between a pattern roll and an anvil roll.
Figure 2B:
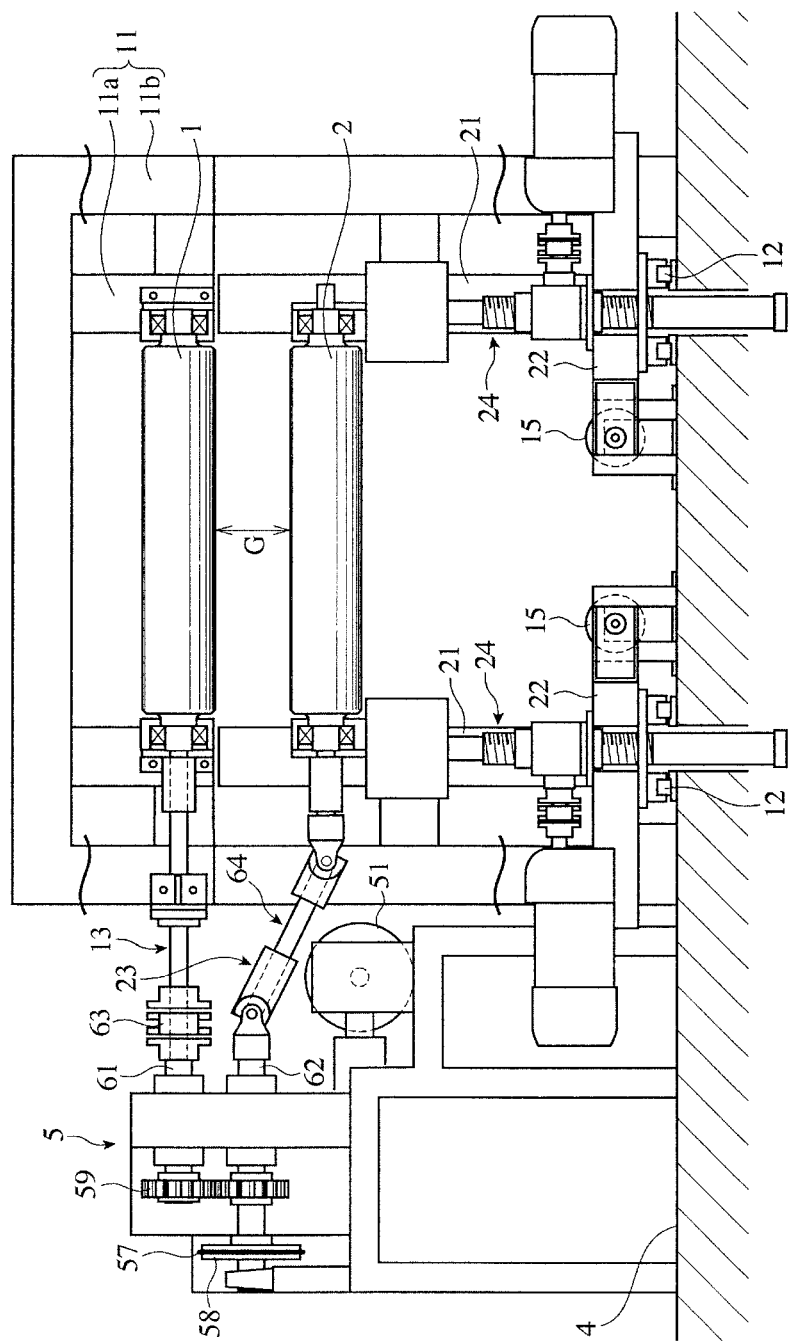
FIG. 2(b) is a front view showing the production apparatus of a microporous plastic film according to the first embodiment of the present invention, with an expanded gap between a pattern roll and an anvil roll.
Figure 3:
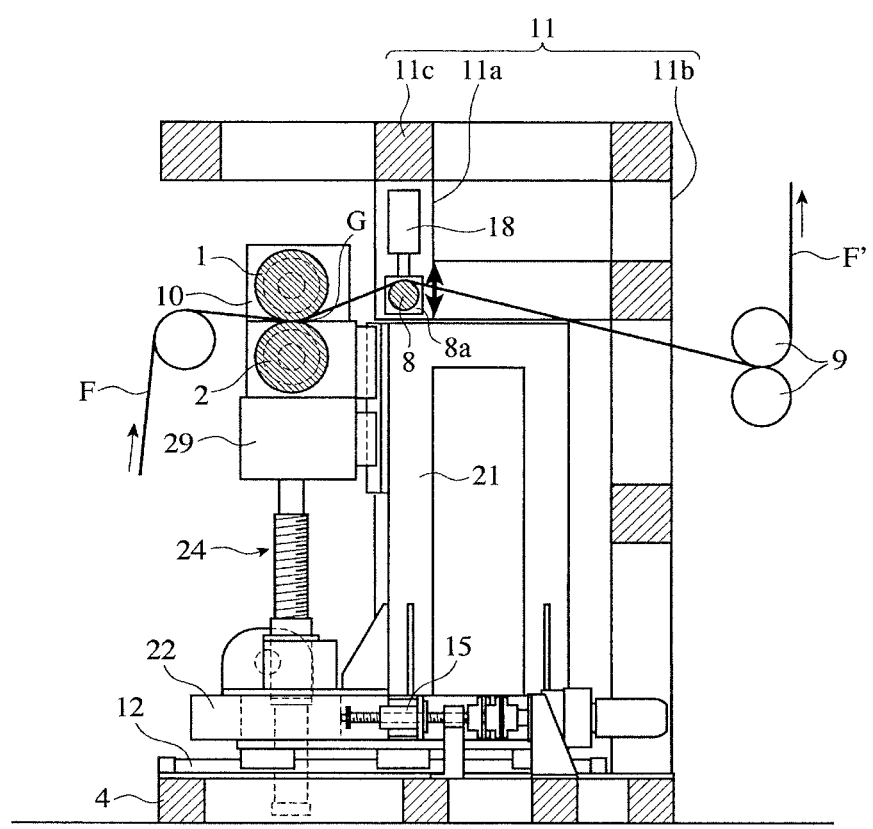
FIG. 3 is a cross-sectional view taken along the line A-A in FIG. 2(a).
Figure 4:
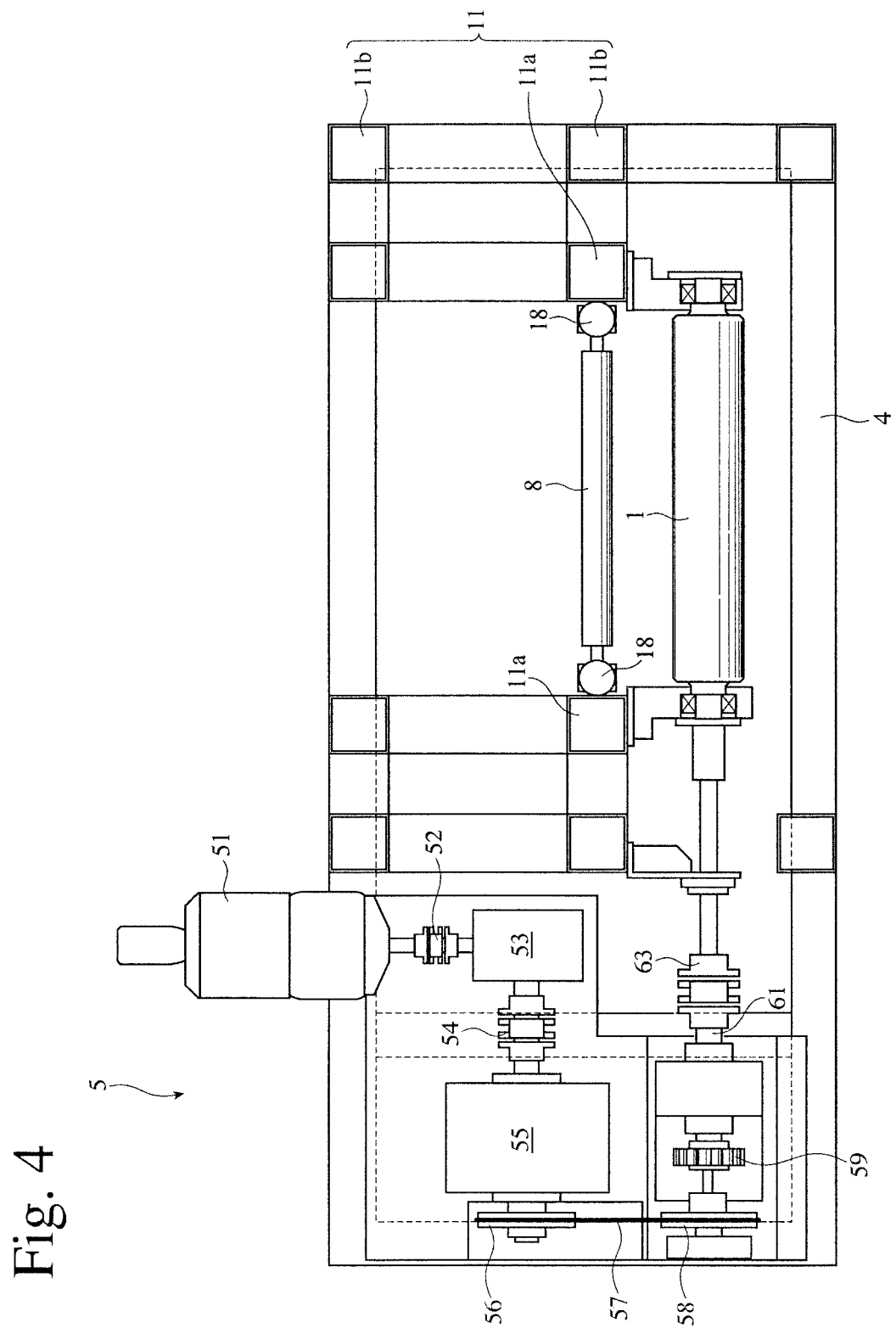
FIG. 4 is a partially omitted plan view showing the production apparatus of a microporous plastic film according to the first embodiment of the present invention.

FIGS. 2-4 show a case where a pattern roll is supported by a stationary frame, and an anvil roll is supported by movable frames, in the production apparatus of a microporous plastic film according to the first embodiment of the present invention. This apparatus comprises a pattern roll 1, an anvil roll 2, a stationary frame 11 rotatably supporting the pattern roll 1, a pair of laterally arranged movable frames 21, 21 rotatably supporting the anvil roll 2, a base 4 to which the stationary frame 11 is fixed, carriages 22, 22 to each of which each movable frame 21, 21 is fixed, rails 12, 12 mounted onto a surface of the base 4 along each of which each carriage 22, 22 moves, first driving means 15, 15 fixed to a surface of the base 4 for moving each carriage 22, 22, a second driving means 13 for rotating the pattern roll 1, a third driving means 23 for rotating the anvil roll 2, and a pair of fourth driving means 24, 24 for moving the anvil roll 2 up and down.

(1) Base

Figure 5:
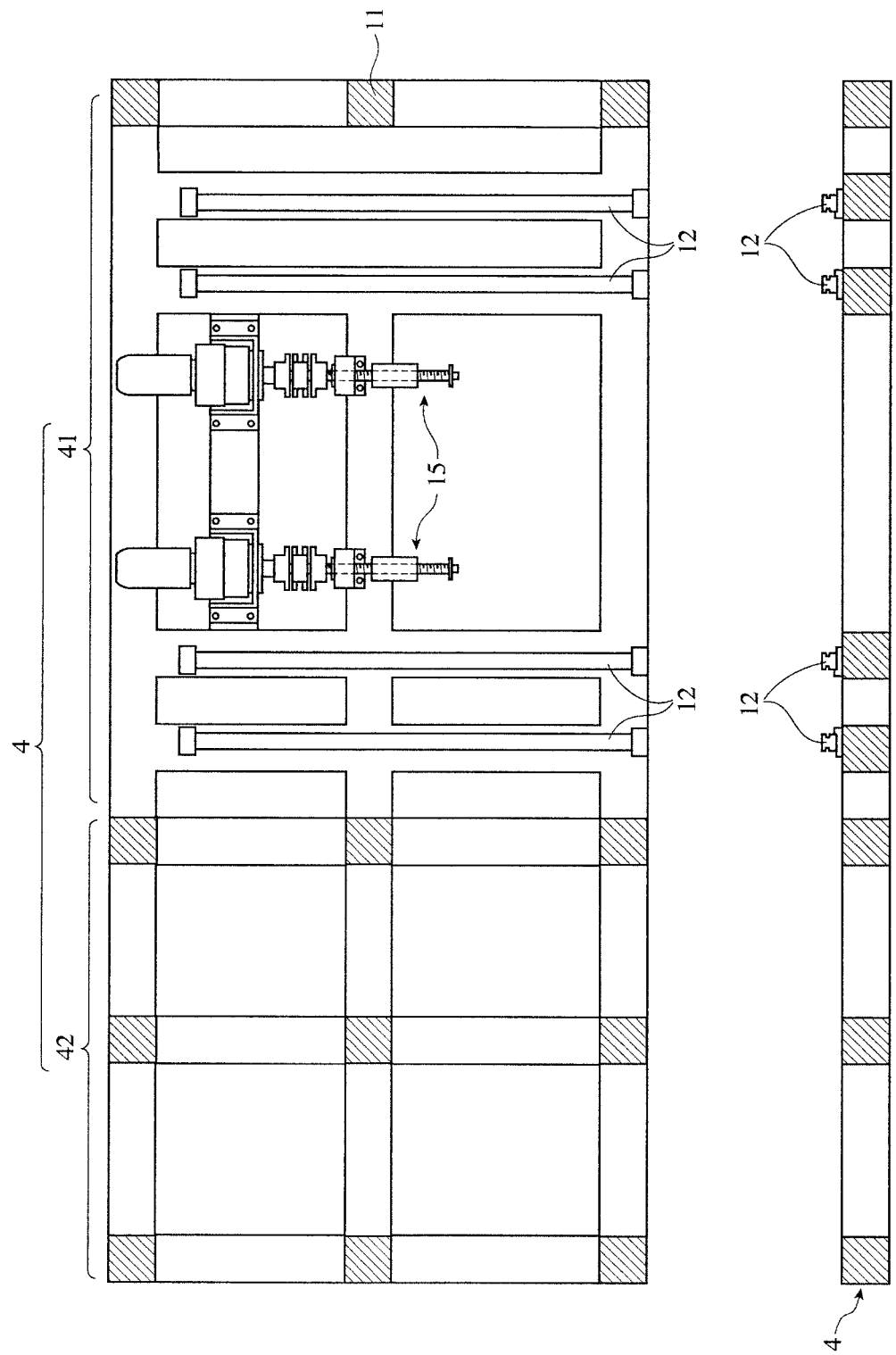
FIG. 5 is a partially cross-sectional plan view showing a base, a stationary frame, and first driving means constituting the production apparatus of a microporous plastic film according to the first embodiment of the present invention.

As shown in FIG. 5, the base 4 comprises a region (rail region) 41 in which two pairs of rails 12, 12 for moving the carriages 22, 22 are fixed, and a region (driving region) 42 in which the driving mechanism 5 connected to the second and third driving means 13, 23 is mounted. Each rail 12 extends in a direction perpendicular to a center axis of the pattern roll 1 rotatably supported by first stationary frame portions 11a, 11a described below (in a running direction of a plastic film F).

(2) Stationary Frame

Figure 6:
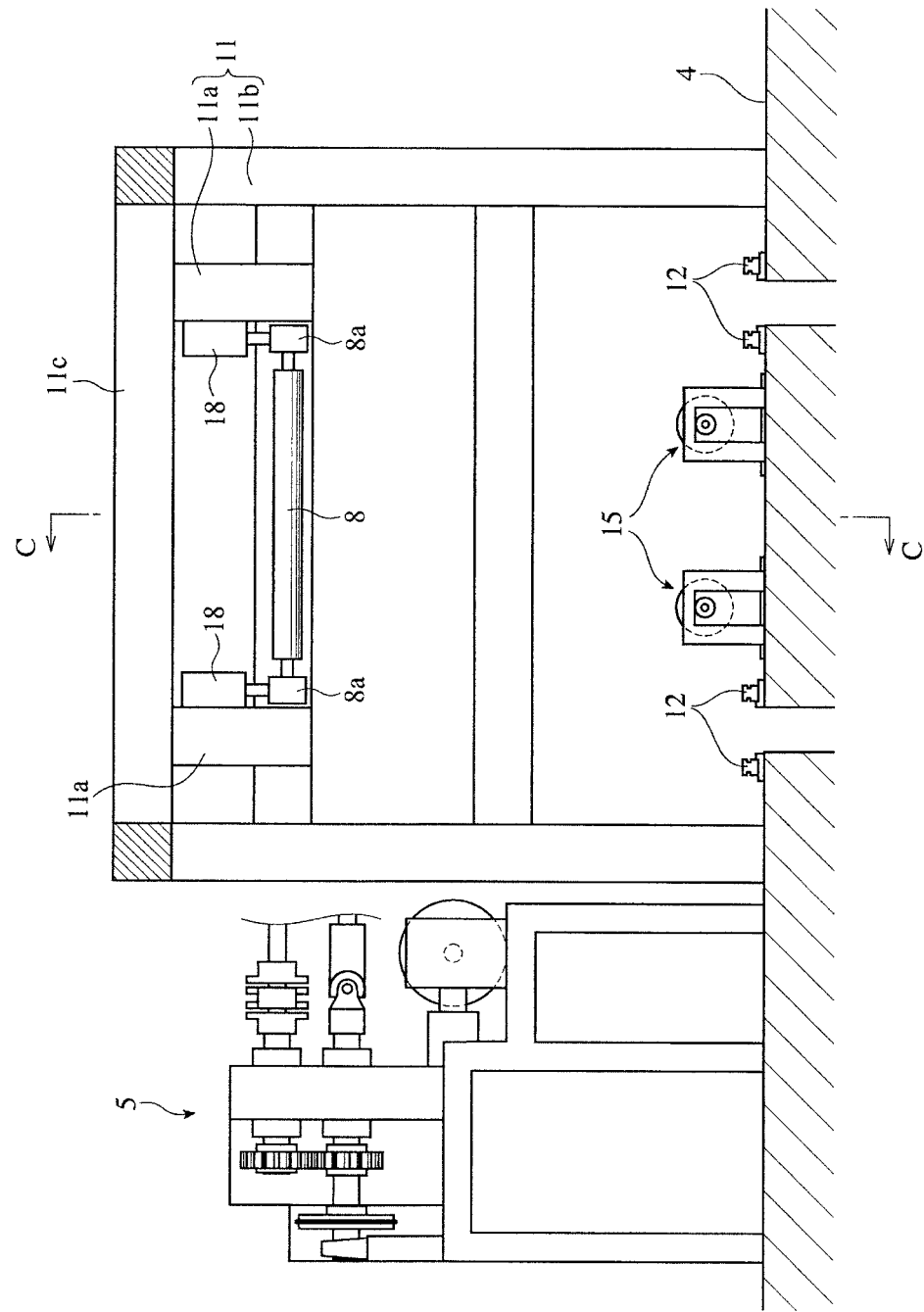
FIG. 6 is a partially cross-sectional a front view showing a base, a stationary frame, first driving means, a driving mechanisms connected to second and third driving means, and a strain-removing roll constituting the production apparatus of a microporous plastic film according to the first embodiment of the present invention.
Figure 7:
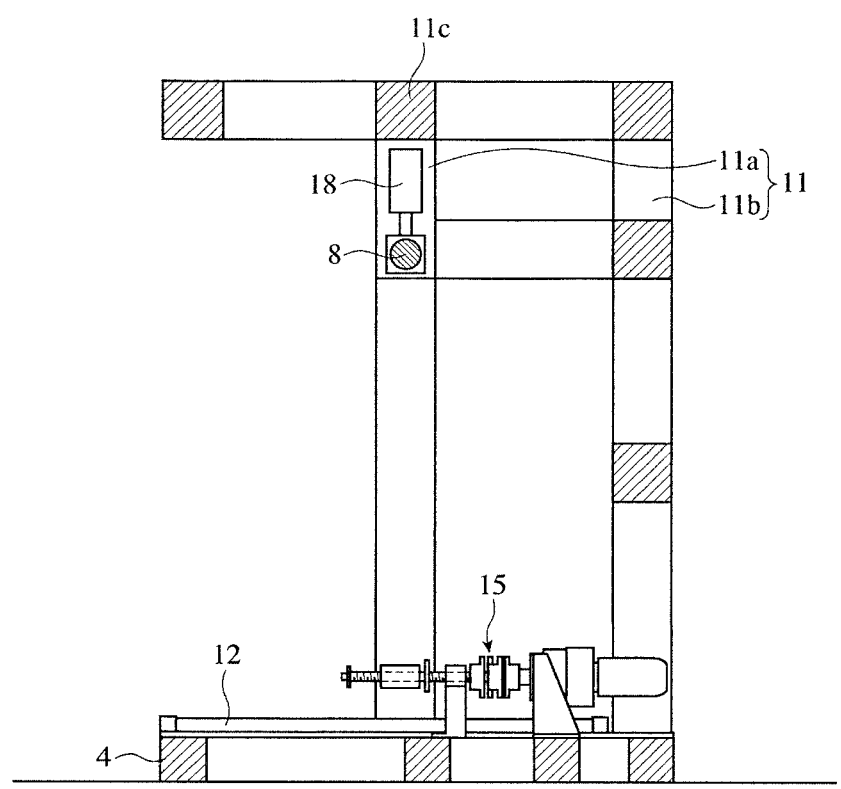
FIG. 7 is a cross-sectional view taken along the line C-C in FIG. 6.

As shown in FIGS. 6 and 7, the stationary frame 11 comprises first to third stationary frame portions 11a, 11b, 11c. The first stationary frame portions 11a, 11 a rotatably supporting the pattern roll 1 are suspended from the third stationary frame portion 11c supported by the second stationary frame portions 11b, 11b fixed to the base 4, and the second and third stationary frame portions 11b, 11b, 11c constitute a portal frame structure.

(3) Carriage and Movable Frame

As is clear from FIG. 8, each carriage 22 comprises guide members 25, 25 on its bottom surface, each guide member 25 being slidably movable along each rail 12 fixed to the base 4. Accordingly, each carriage 22 is movable along a pair of rails 12, 12 in a direction perpendicular to the center axis of the pattern roll 1. Because the carriages 22, 22 are independently movable along different pairs of rails 12, 12, the following three cases are possible: (1) one carriage 22 moves forward, while the other carriage 22 stays; (2) one carriage 22 moves rearward, while the other carriage 22 stays; and (3) one carriage 22 moves forward, while the other carriage 22 moves rearward. Each carriage 22 has a center opening 22a receiving the fourth driving means 24 for moving the anvil roll 2 up and down.

Figure 8A:
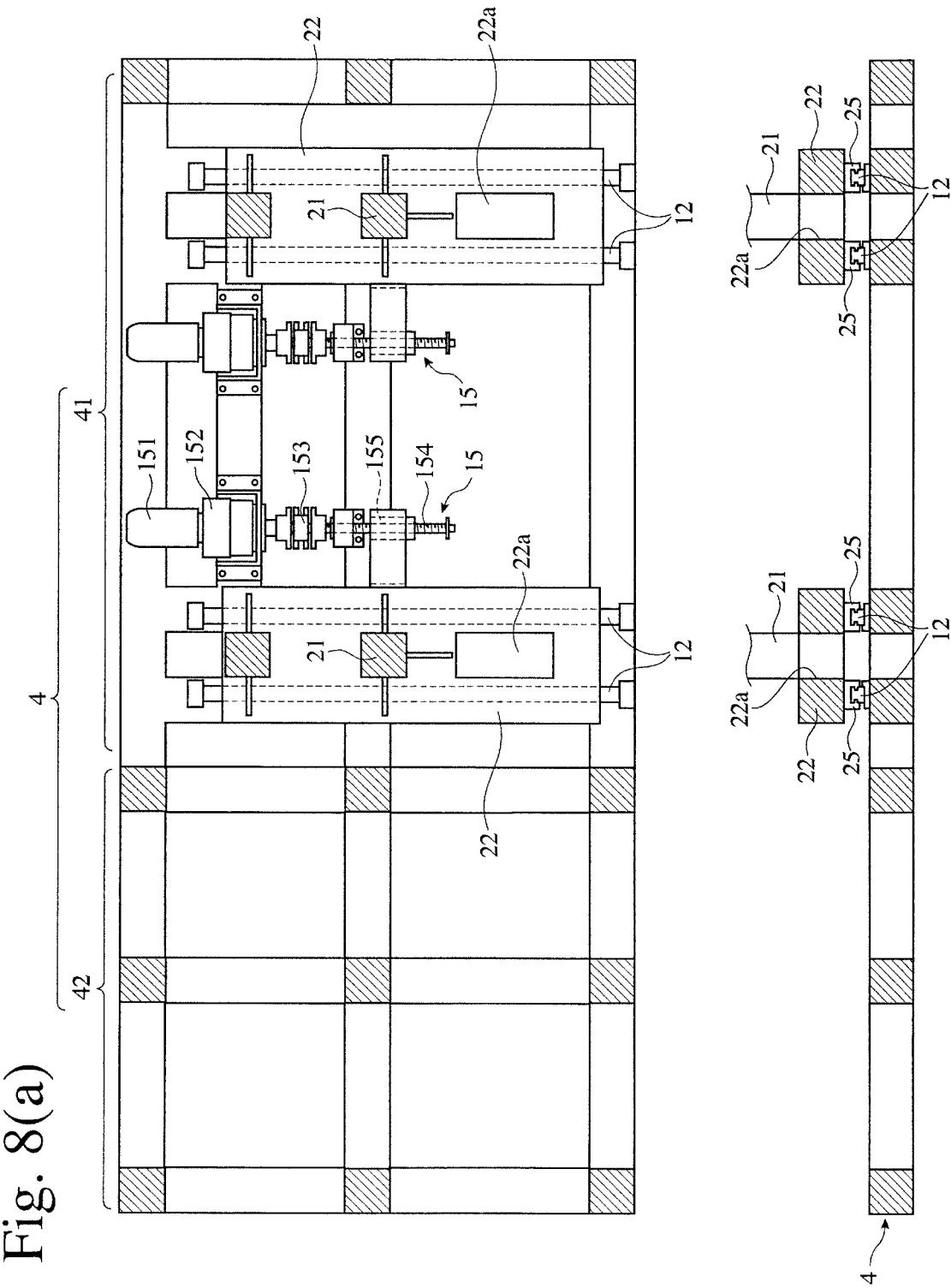
FIG. 8(a) is a cross-sectional view taken along the line B-B in FIG. 2(a).
Figure 8B:
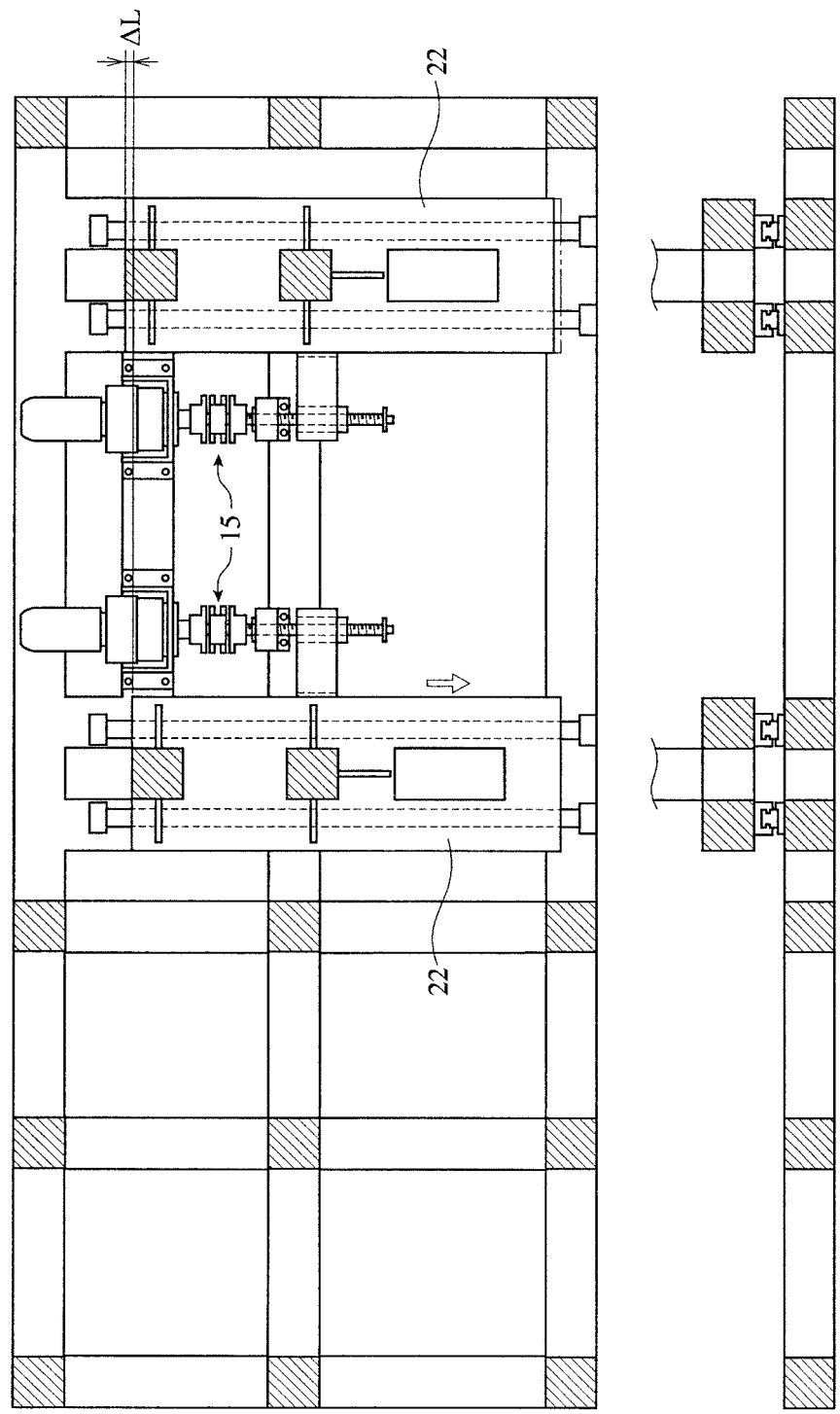
FIG. 8(b) is a cross-sectional view corresponding to FIG. 8(a), which shows a state where one carriage has moved by ΔL.

As is clear from FIGS. 3 and 8(a), each first driving means 15 fixed to the base 4 moves each carriage 22 along the rails 12. Each first driving means 15 comprises a motor 151, a reduction gear 152 connected to a rotation shaft of the motor 151, a male screw member 154 connected to a rotation shaft of the reduction gear 152 via a coupling unit 153, and a female screw member 155 fixed to each carriage 22 and threadably engaging the male screw member 154. When the motor 151 is operated, the male screw member 154 is rotated, so that each carriage 22 to which the female screw member 155 is fixed moves along the rails 12. Because the carriages 22, 22 are independently moved by the first driving means 15, 15, the bearings 20a, 20a of the anvil roll 1 supported by the movable frames 21, 21 each fixed to each carriage 22, 22 are displaced from the bearings 10a, 10a of the pattern roll 1 by ΔL in a direction perpendicular to the center axis of the pattern roll 1 (in a running direction of the plastic film F), as shown in FIG. 8(b). As a result, as shown in FIG. 1(b), the center axis of the anvil roll 1 is inclined from the center axis of the pattern roll 1 by an angle θ.

Figure 9:
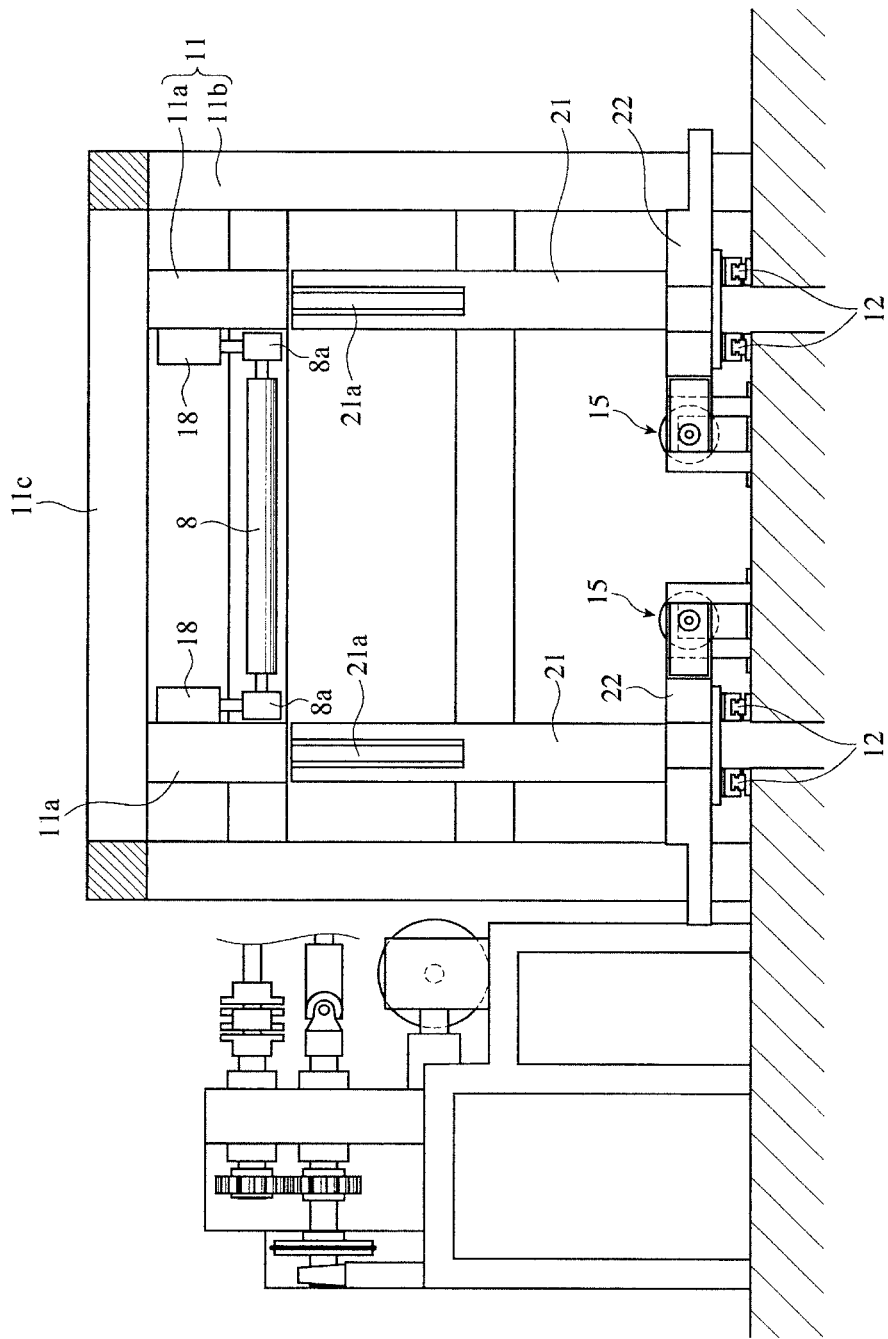
FIG. 9 is a partially cross-sectional a front view showing a stationary frame and movable frames constituting the production apparatus of a microporous plastic film according to the first embodiment of the present invention.
Figure 10:
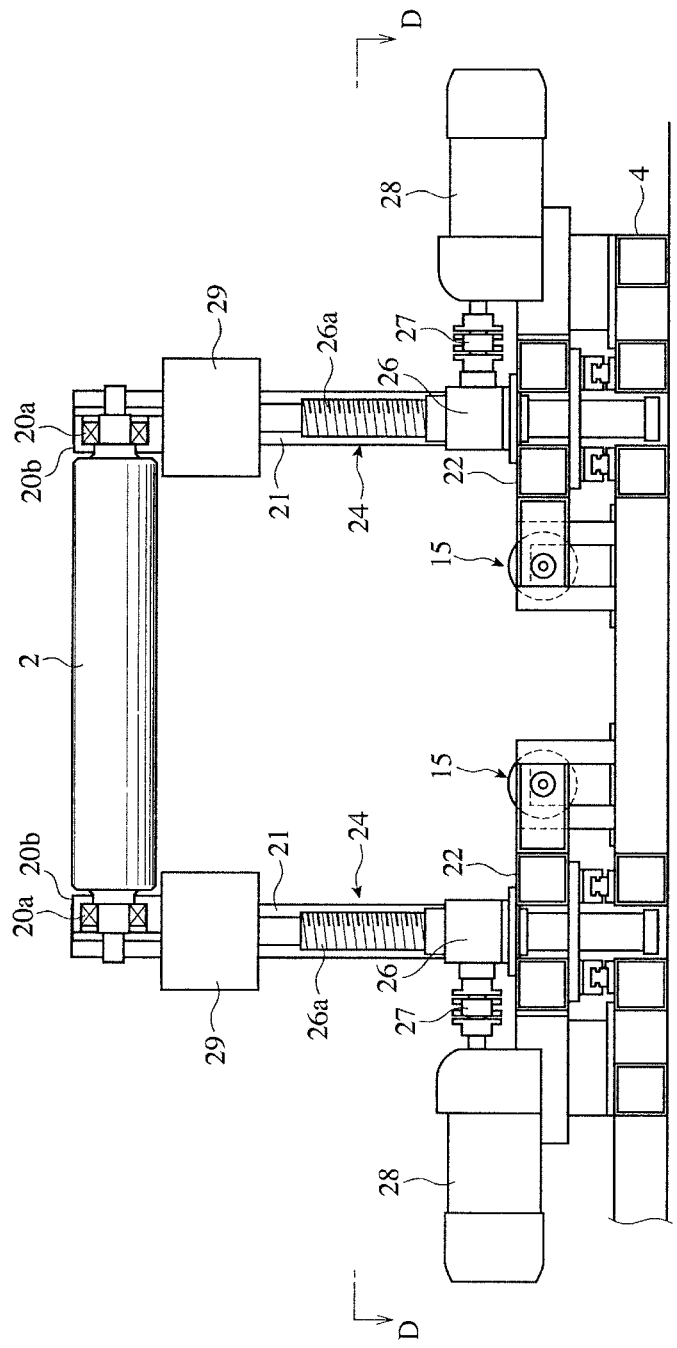
FIG. 10 is a front view showing first driving means fixed to a base, fourth driving means supported by a pair of carriages and movable frames, and an anvil roll.
Figure 11:
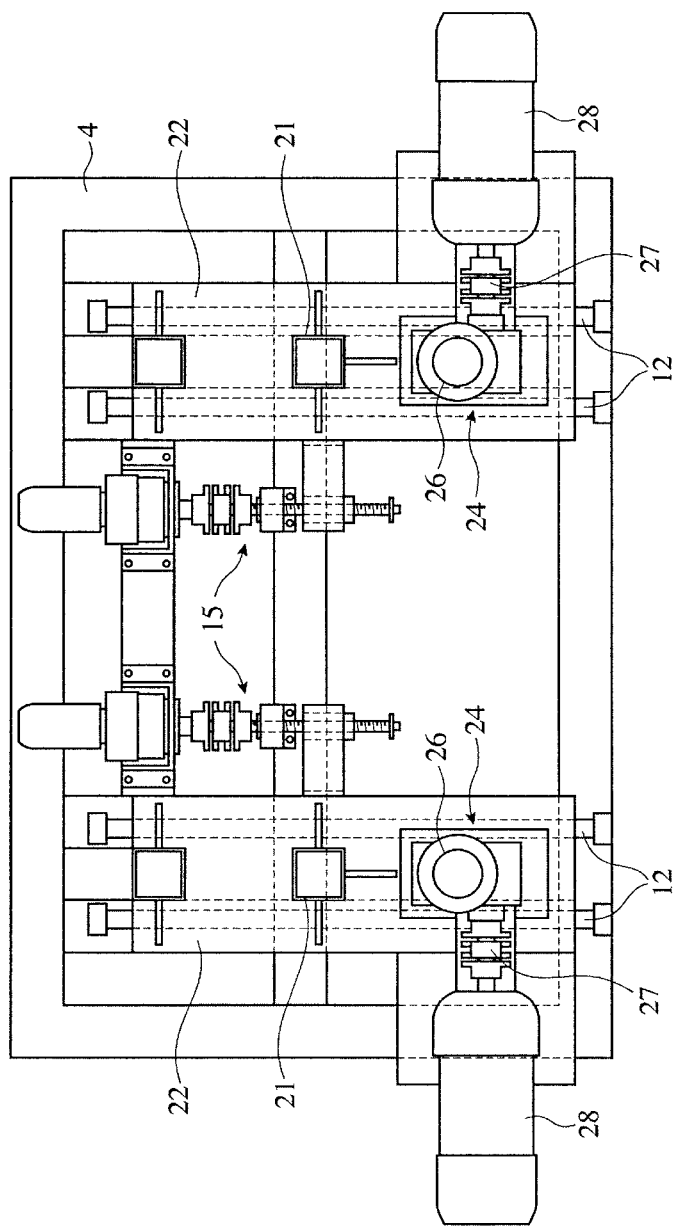
FIG. 11 is a cross-sectional view taken along the line D-D in FIG. 10.
Figure 12A:
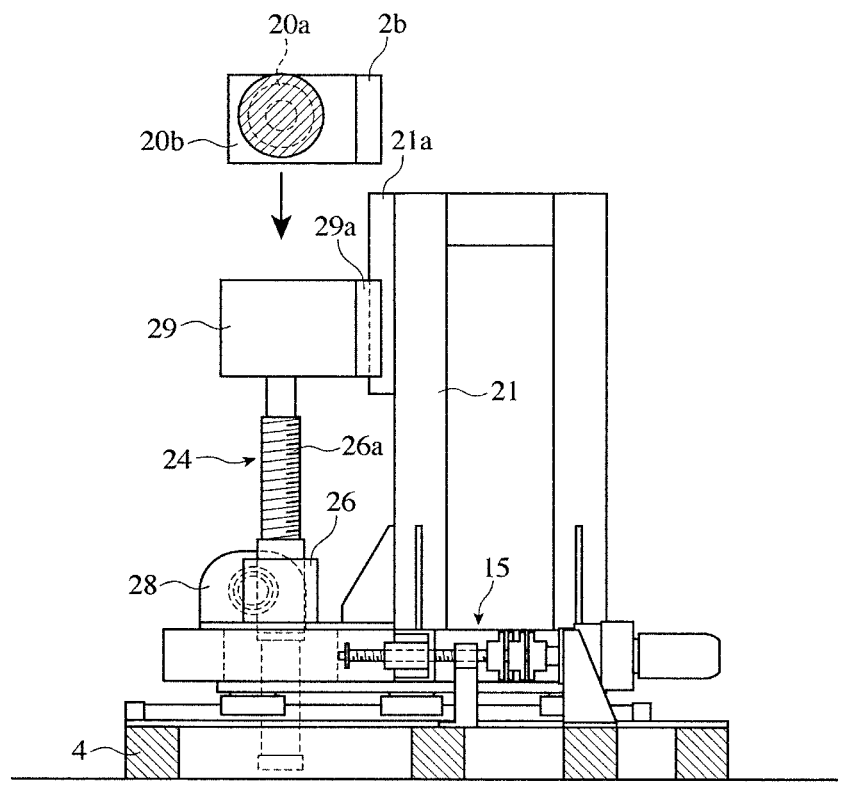
FIG. 12(a) is a partially cross-sectional side view of FIG. 10 showing a state where an anvil roll is detached from a rail of each movable frame.
Figure 12B:
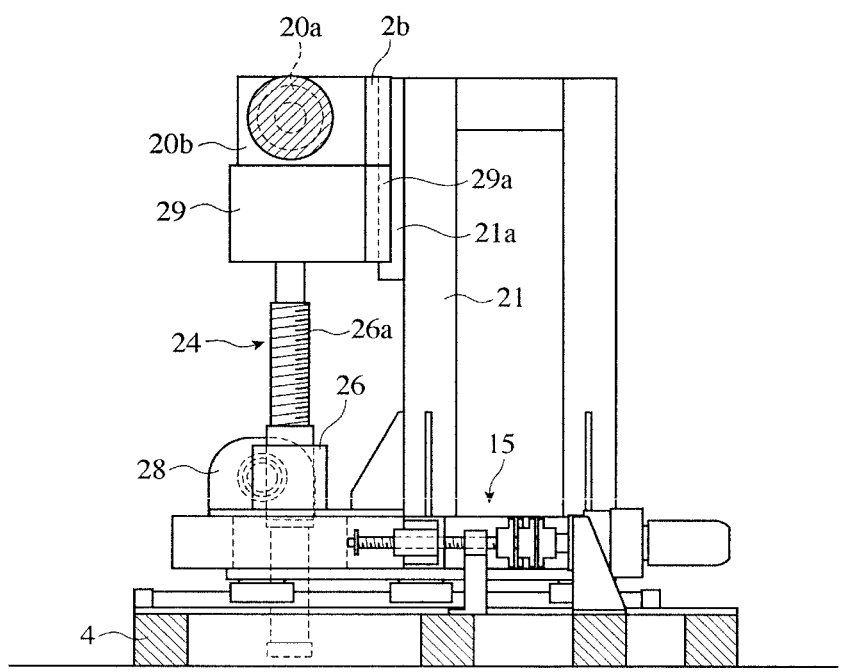
FIG. 12(b) is a partially cross-sectional side view of FIG. 10 showing a state where an anvil roll is in contact with a resilient unit in each fourth driving means.

As is clear from FIG. 9, each movable frame 21 fixed to each carriage 22 has a vertical rail 21a in an upper portion thereof. As shown in FIGS. 10-12, the fourth driving means 24 for moving the anvil roll 2 up and down along the rail 21a comprises a screw jack 26 mounted to the carriage 22 such that a male screw member 26a of the screw jack 26 penetrates the opening 22a, a motor 28 connected to the screw jack 26 via a link mechanism 27, and a resilient unit 29 attached to an upper end of the male screw member 26a. The resilient unit 29 pushes a bearing box 20b containing the bearing 20a of the anvil roll 2 upward. The resilient unit 29 comprises a resilient member such as a coil spring, etc. to prevent the application of excessive shock to the bearing 20a of the anvil roll 2. As shown in FIG. 12(a), with a guide member 2b fixed to the bearing box 20b of the anvil roll 2, and with a guide member 29a fixed to the resilient unit 29, the bearing box 20b of the anvil roll 2 and the resilient unit 29 are both movable up and down along the rail 21a of the movable frame 21.

(4) Pattern Roll and Anvil Roll

Figure 13:
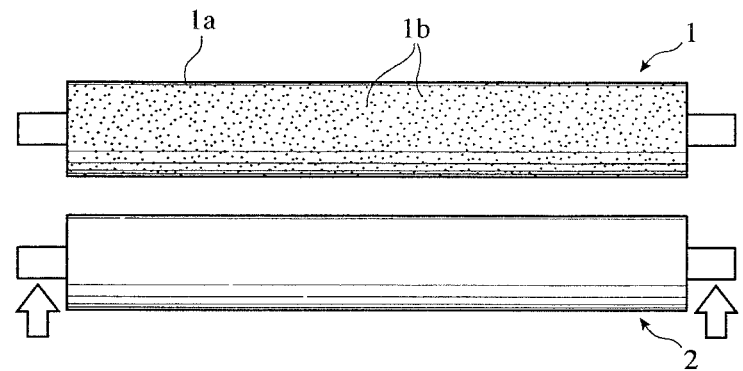
FIG. 13 is a front view showing a combination of a pattern roll and an anvil roll having a flat rolling surface.
Figure 14:
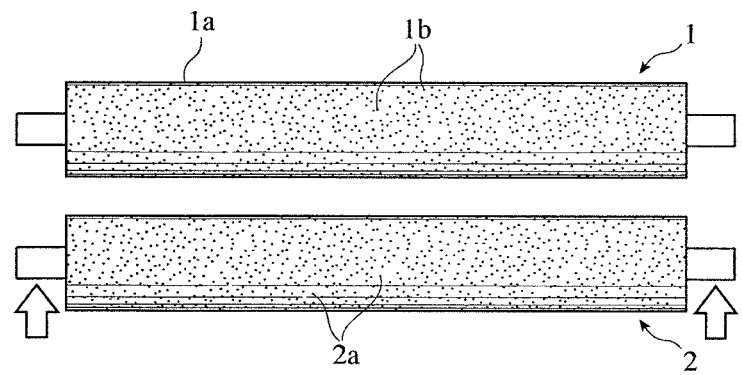
FIG. 14 is a front view showing a combination of a pattern roll and an anvil roll having recesses on the rolling surface.
Figure 15:
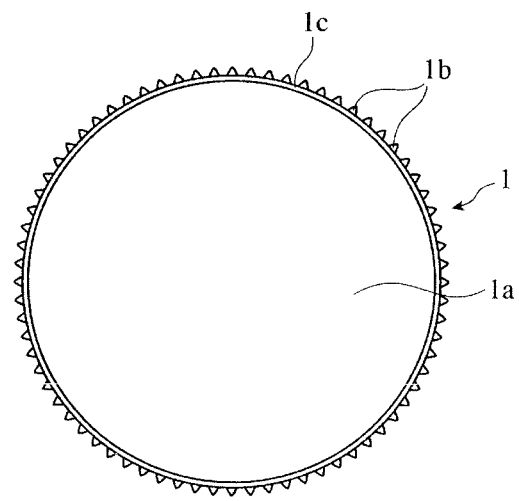
FIG. 15 is a schematic cross-sectional view showing a pattern roll.

FIG. 13 shows a combination of a pattern roll 1 and an anvil roll having a flat rolling surface 2, and FIG. 14 shows a combination of a pattern roll 1 and an anvil roll 2 having large numbers of recesses on a rolling surface.

(a) Pattern Roll

The pattern roll 1 preferably comprises large numbers of high-hardness, fine particles 1b randomly fixed to a rolling surface of a metal roll body 1a by a plating layer 1c such as nickel plating, etc. The particle size distribution of high-hardness, fine particles 1b fixed to a rolling surface of the pattern roll 1 differs depending on (i) the material and thickness of a plastic film used, (ii) the depth, opening diameter and area ratio of fine pores formed, and (iii) whether the anvil roll has recesses or not. Specific examples of the pattern roll 1 are described in, for example, JP 5-131557 A, JP 9-57860 A, and JP 2002-59487 A.

The high-hardness, fine particles 1b have sharp edges (corners), with Mohs hardness of 5 or more. The high-hardness, fine particles 1b having sharp edges are preferably fine diamond particles, particularly pulverized fine diamond particles. The aspect ratios of the high-hardness, fine particles 1b are preferably 3 or less, more preferably 2 or less, most preferably 1.5 or less. With smaller aspect ratios, the high-hardness, fine particles 1b have polygonal shapes close to spheres.

It is preferable to use high-hardness, fine particles 1b having a particle size distribution in a range of 10-500 μm, depending on the depths and opening diameters of fine pores formed. Because the high-hardness, fine particles 1b have various shapes and particle sizes, a classification treatment is preferably conducted to make their shapes and particle sizes more uniform.

The area ratio of high-hardness, fine particles 1b on a rolling surface of the pattern roll 1 (a percentage of the pattern roll surface occupied by the high-hardness, fine particles 1b) is preferably 10-70%. When the area ratio of high-hardness, fine particles 1b is less than 10%, fine pores cannot be formed at a sufficient area ratio in the plastic film. On the other hand, it is practically difficult to fix high-hardness, fine particles 1b to a rolling surface of the pattern roll 1 at an area ratio of more than 70%. The area ratio of high-hardness, fine particles 1b is more preferably 20% in lower limit, and 60% in upper limit.

To prevent the pattern roll 1 from bending while perforating the plastic film, a roll body 1a of the pattern roll 1 is preferably made of a hard metal. The hard metal may be die steel such as SKD11.

(b) Anvil Roll

In order that the anvil roll 2 to be combined with the pattern roll 1 enables the high-hardness, fine particles 1b of the pattern roll 1 to sufficiently intrude a plastic film, while exhibiting sufficient deformation resistance to a perforating load, the anvil roll 2 is preferably made of a high-strength, hard metal, particularly a high-strength, corrosion-resistant stainless steel (SUS440C, SUS304, etc.). Also, the anvil roll 2 may have a two-layer structure comprising an inner layer of a hard metal such as die steel, and an outer layer of high-strength, corrosion-resistant stainless steel such as SUS304. The thickness of the outer layer may be practically about 20-60 mm.

(c) Combination of Pattern Roll and Anvil Roll Having Large Numbers of Recesses on Rolling Surface When a pattern roll 1 is combined with an anvil roll 2 having large numbers of recesses 2a on the rolling surface as shown in FIG. 14, a plastic film F passing through a gap between the pattern roll 1 and the anvil roll 2 is plastically deformed by the high-hardness, fine particles 1b, and engages the recesses 2a of the anvil roll 2 as shown in FIGS. 16(b) to 18. Partially expanded in narrow gaps between the high-hardness, fine particles 1b and the recesses 2a, the plastic film F is partially ruptured. The plastic film F is also cut in regions in which the high-hardness, fine particles 1b come into contact with the recesses 2a of the anvil roll 2. As a result, portions of the plastic film F pushed by the high-hardness, fine particles 1b of the pattern roll 1 into the recesses 2a of the anvil roll 2 are deformed to shapes of dents Fa, and cut portions (rupture openings) Fb are provided in the dents Fa. The rupture openings Fb are formed mainly around peripheral bottom portions of the dents Fa (boundary regions between bottom portions and side portions), though not restrictive of course. The rupture openings Fb may also be formed in other portions, depending on combinations of the shapes of high-hardness, fine particles 1b and the shapes of recesses 2a.

In a pattern roll 1 to be combined with an anvil roll 2 having recesses 2a on the rolling surface, the high-hardness, fine particles 1b preferably have a particle size distribution in a range of 20-500 μm. When the high-hardness, fine particles 1b have particle sizes of less than 20 μm, dents Fa formed in the plastic film F have insufficient opening diameters, failing to have sufficient rupture openings Fb. On the other hand, when the high-hardness, fine particles 1b have particle sizes of more than 500 μm, plastic dents Fa having too large opening diameters are formed in the film F, resulting in too large rupture openings Fb. The lower limit of the particle sizes of the high-hardness, fine particles 1b is preferably 50 μm, more preferably 100 μm. The upper limit of the particle sizes of the high-hardness, fine particles 1b are preferably 400 μm, more preferably 300 μm.

The high-hardness, fine particles 1b preferably have aspect ratios of 2 or less. With the aspect ratios of 2 or less, the high-hardness, fine particles 1b have polygonal shapes close to spheres. The aspect ratios of the high-hardness, fine particles 1b are preferably 1.6 or less, more preferably 1.4 or less.

Because about ½-⅔ of high-hardness, fine particles 1b are embedded in a plating layer 1c, high-hardness, fine particles 1b projecting from a surface of the plating layer 1c have a height distribution in a range of 10-250 μm. When the height of high-hardness, fine particles 1b is less than 10 μm, sufficiently deep dents Fa are not formed in the plastic film F, failing to have sufficient rupture openings Fb. On the other hand, when the height of high-hardness, fine particles 1b is more than 250 μm, too deep dents Fa are formed in the plastic film F, providing too large rupture openings Fb. The lower limit of the height distribution of high-hardness, fine particles 1b is preferably 20 μm, more preferably 30 μm. The upper limit of the height distribution of high-hardness, fine particles 1b is preferably 200 μm, more preferably 150 μm.

The high-hardness, fine particles 1b preferably have an average particle size of 100-400 μm, and average height of 50-200 μm. The lower limit of the average particle size of high-hardness, fine particles 1b is more preferably 150 μm, most preferably 200 μm. The upper limit of the average particle size of high-hardness, fine particles 1b is more preferably 350 μm, most preferably 300 μm. The lower limit of the average height of high-hardness, fine particles 1b is preferably 60 μm more, most preferably 70 μm. The upper limit of the average height of high-hardness, fine particles 1b is more preferably 150 μm, most preferably 120 μm.

As described below, because the high-hardness, fine particles 1b of the pattern roll 1 engage the recesses 2a of the anvil roll 2 to form dents Fa in the plastic film F, the high-hardness, fine particles 1b should have as close sizes and shapes to those of the recesses 2a as possible. To this end, the width of the particle size distribution of high-hardness, fine particles 1b is preferably as narrow as possible. The term "width of the particle size distribution" means the difference between the maximum particle size and the minimum particle size. Of course, the width of the opening diameter distribution of the recesses 2a (difference between the maximum opening diameter and the minimum opening diameter) is also preferably as narrow as possible. An arbitrary combination of high-hardness, fine particles 1b having a narrow particle size distribution with recesses 2a having a narrow opening diameter distribution results in high probability of sufficient engaging, thereby forming sufficiently large dents Fa in the plastic film F, with rupture openings Fb in many dents Fa.

For the above reasons, the width of the particle size distribution of high-hardness, fine particles 1b is preferably 120 μm or less, more preferably 100 μm or less. The particle size distribution of 20-500 μm with its width of 120 μm or less means that for example, the lower limit of particle sizes of high-hardness, fine particles 1b is 380 μm when the upper limit is 500 μm, and 280 μm when the upper limit is 400 μm. Accordingly, high-hardness, fine particles 1b having relatively large particle sizes (width of 120 μm or less) in the particle size distribution range of 20-500 μm are used when relatively large dents Fa are formed in the plastic film F, while high-hardness, fine particles 1b having relatively small particle sizes (width of 120 μm or less) in the particle size distribution range of 20-500 μm are used when relatively small dents Fa are formed. Similarly, the width of the height distribution of high-hardness, fine particles 1b (difference between the maximum height and the minimum height) is preferably 50 μm or less, more preferably 40 μm or less.

The recesses 2a of the anvil roll 2 have an opening diameter distribution in a range of 70-400 μm, and a depth distribution in a range of 15-250 μm. When the recesses 2a have opening diameters of less than 70 μm or depth of less than 15 μm, too small dents Fa are formed in the plastic film F, failing to obtain sufficient rupture openings. On the other hand, when the recesses 2a have opening diameters of more than 400 μm or depth of more than 250 μm, too large dents Fa are formed in the plastic film F, resulting in too large rupture openings. The lower limit of the opening diameters of the recesses 2a is preferably 80 μm, more preferably 90 μm. The upper limit of the opening diameters of the recesses 2a is preferably 350 μm, more preferably 300 μm. Further, the lower limit of the depth of the recesses 2a is preferably 20 μm, more preferably 30 μm. The upper limit of the depth of the recesses 2a is preferably 200 μm, more preferably 150 μm.

The recesses 2a of the anvil roll 2 preferably have an average opening diameter of 100-400 μm and average depth of 50-200 μm. When the recesses 2a have an average opening diameter of less than 100 μm or average depth of less than 50 μm, too small dents Fa are formed in the plastic film F, failing to obtain sufficient rupture openings. On the other hand, when the recesses 2a have an average opening diameter of more than 400 μm or average depth of more than 200 μm, too large dents Fa are formed in the plastic film F, resulting in too large rupture openings. The lower limit of the average opening diameter of the recesses 2a is more preferably 120 μm, most preferably 140 μm. The upper limit of the average opening diameter of the recesses 2a is more preferably 300 μm, most preferably 250 μm. Further, the lower limit of the average depth of the recesses 2a is more preferably 60 μm, most preferably 70 μm. The upper limit of the average depth of the recesses 2a is more preferably 150 μm, most preferably 100 μm.

The recesses 2a of the anvil roll 2 also preferably have uniform shapes and sizes. To this end, the recesses 2a preferably have an opening diameter distribution width of 100 μm or less and a depth distribution width (difference between the maximum depth and the minimum depth) of 50 μm or less. The opening diameter distribution of 70-400 μm with width of 100 μm or less means that for example, the lower limit of the opening diameters of the recesses 2a is 300 μm when the upper limit is 400 μm, and 150 μm when the upper limit is 250 μm. Accordingly, recesses 2a having relatively large opening diameters (width of 100 μm or less) in an opening diameter distribution range of 70-400 μm are used when relatively large dents Fa are formed in the plastic film F, while recesses 2a having relatively small opening diameters (width of 100 μm or less) in an opening diameter distribution range of 70-400 μm are used when relatively large dents Fa are formed. The width of the opening diameter distribution of the recesses 2a is more preferably 80 μm or less. Similarly, the width of the opening diameter distribution of the recesses 2a is more preferably 50 μm or less, most preferably 40 μm or less.

The area ratio of the recesses 2a on a rolling surface of the anvil roll 2 (percentage of an anvil roll surface occupied by recesses 2a) is preferably 10-70%. When the area ratio of the recesses 2a is less than 10%, dents cannot be formed in the plastic film F at a sufficient area ratio, failing to obtain sufficient moisture permeability. On the other hand, it is practically difficult to form recesses 2a on a rolling surface of the anvil roll 2 at an area ratio of more than 70%. The area ratio of the recesses 2a is more preferably 20% in lower limit, and 60% in upper limit.

A metal roll for an anvil roll 2 having recesses 2a, into which the high-hardness, fine particles 1b of the pattern roll 1 enter, should have sufficient corrosion resistance. Of course, the anvil roll 2 should have sufficient mechanical strength to prevent excessive bending during forming pores in the plastic film F. Accordingly, the anvil roll 2 is preferably made of high-strength, corrosion-resistant stainless steel (SUS440C, SUS304, etc.). The anvil roll 2 may also have a two-layer structure comprising an inner layer of a hard metal such as die steel, and an outer layer of high-strength, corrosion-resistant stainless steel such as SUS304. The outer layer may be practically as thick as about 20-60 mm.

Figure 19:
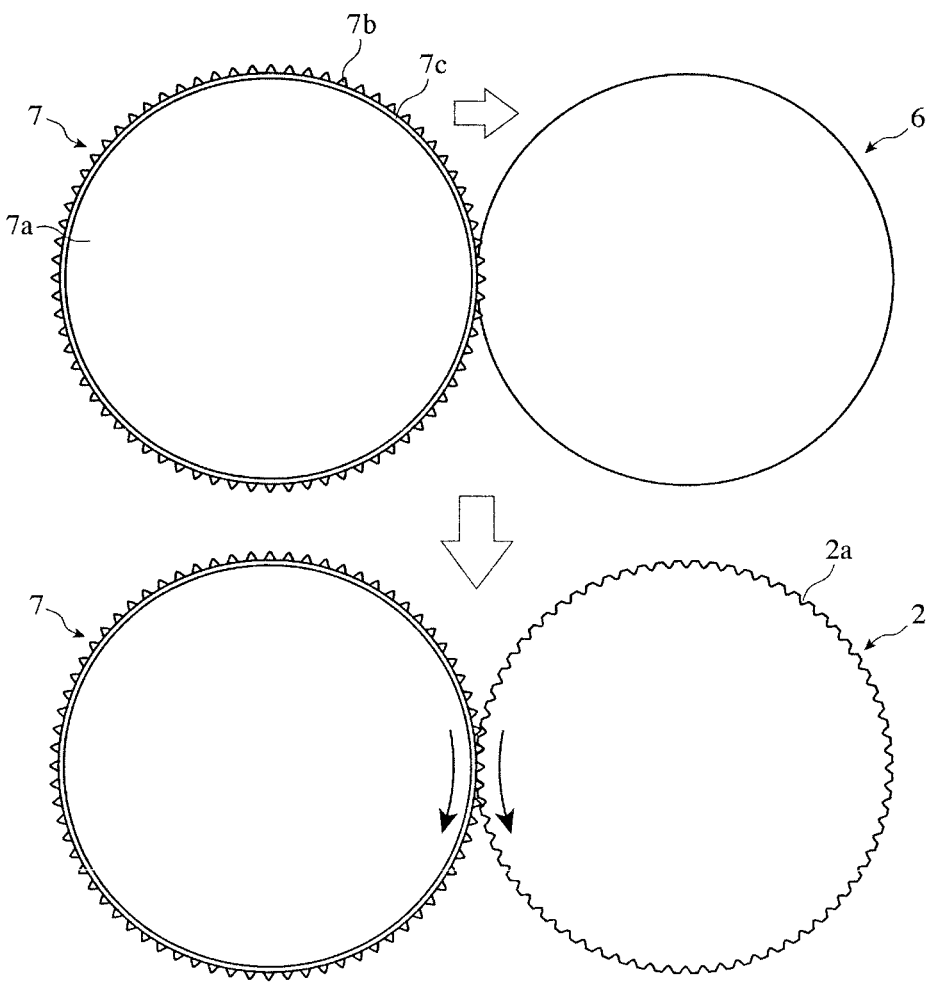
FIG. 19 is a schematic view showing the formation of recesses on a metal roll by a dent-forming pattern roll.

As shown in FIG. 19, an anvil roll 2 randomly having large numbers of recesses 2a on the rolling surface is produced by pressing a dent-forming pattern roll 7 having large numbers of high-hardness, fine particles 7b randomly fixed to a rolling surface of a roll body 7a by a plating layer 7c, to a metal roll 6 having a flat rolling surface. Like the pattern roll 1, high-hardness, fine particles 7b on the dent-forming pattern roll 7 preferably have having sharp edges, Mohs hardness of 5 or more, aspect ratios of 2 or less, a particle size distribution in a range of 20-500 μm, and a height distribution (from a surface of the plating layer 7c) in a range of 10-250 μm.

Further, high-hardness, fine particles 7b on the dent-forming pattern roll 7 preferably have an average particle size of 100-400 μm and an average height of 50-200 μm. The lower limit of the average particle size of high-hardness, fine particles 7b is more preferably 150 μm, most preferably 200 μm. The upper limit of the average particle size of high-hardness, fine particles 7b is more preferably 350 μm, most preferably 300 μm. The lower limit of the average height of high-hardness, fine particles 7b is more preferably 60 μm, most preferably 70 μm. The upper limit of the average height of high-hardness, fine particles 7b is more preferably 150 μm, most preferably 120 μm.

The aspect ratios of high-hardness, fine particles 7b are more preferably 1.6 or less, most preferably 1.4 or less. The area ratio of high-hardness, fine particles 7b is preferably 10-70%, more preferably 20% in lower limit and 60% in upper limit.

Because the high-hardness, fine particles of the dent-forming pattern roll 7 may have the same distribution as that of the pattern roll 1 as described above, the pattern roll 1 may be used as a dent-forming pattern roll 7.

Because high-hardness, fine particles (for example, fine diamond particles) 7b are sufficiently harder than the metal roll 6, pressing by the dent-forming pattern roll 7 forms recesses 2a corresponding to the high-hardness, fine particles 7b on a rolling surface of the metal roll 6. Burrs around recesses 2a formed on a rolling surface of the metal roll 6 are removed by grinding, etc. The metal roll 6 provided with recesses 2a acts as an anvil roll 2.

A larger pushing force of the dent-forming pattern roll 7 to the metal roll 6 provides larger recesses 2a with a larger area ratio. A pushing force necessary for forming large numbers of recesses 2a having an opening diameter distribution in a range of 70-400 μm and a depth distribution in a range of 15-250 μm on a rolling surface of the metal roll 6 by the high-hardness, fine particles 7b of the dent-forming pattern roll 7 is preferably in a range of 0.002-1.47 kN/cm (0.2-150 kgf/cm) by linear pressure.

The particle size of each high-hardness, fine particle 1b on the pattern roll 1 is expressed by a diameter of a circle having the same area (equivalent circle diameter), and the opening diameter of each recess 2a on the anvil roll 2 is expressed by a diameter of a circle having the same area (equivalent circle diameter). Likewise, the opening diameter of each dent Fa in the microporous plastic film F is expressed by an equivalent circle diameter.

To form large numbers of dents Fa having rupture openings Fb in the plastic film F, the recesses 2a of the anvil roll 2 should be as large as receiving the high-hardness, fine particles 1b of the pattern roll 1 with small gaps G'. Accordingly, (a) the high-hardness, fine particles 1b of the pattern roll 1 preferably have a particle size distribution in a range of 20-500 μm and a height distribution in a range of 10-250 μm, (b) the recesses 2a of the anvil roll 2 preferably have an opening diameter distribution in a range of 70-400 μm and a depth distribution in a range of 15-250 μm, (c) the high-hardness, fine particles preferably have a particle size distribution width of 120 μm or less and a height distribution width (difference between the maximum height and the minimum height) of 50 μm or less, (d) the recesses 2a preferably have an opening diameter distribution width of 100 μm or less and a depth distribution width of 50 μm or less, (e) the high-hardness, fine particles 1b preferably have an average particle size of 100-400 μm and an average height of 50-200 μm, and (f) the recesses 2a preferably have an average opening diameter of 100-400 μm and an average depth of 50-200 μm.

Because the recesses 2a preferably receive the high-hardness, fine particles 1b with slight gaps G', the difference between the average opening diameter of the recesses 2a and the average particle size of the high-hardness, fine particles 1b is preferably 100 μm or less, more preferably 50 μm or less. Also, the difference between the average depth of the recesses 2a and the average height of the high-hardness, fine particles 1b is preferably 50 μm or less, more preferably 30 μm or less. When the first pattern roll is equal to the second pattern roll, the difference between the average opening diameter of the recesses 2a and the average particle size of the high-hardness, fine particles 1b can be made as small as possible, and the recesses 2a and the high-hardness, fine particles 1b can have substantially the same aspect ratios.

As described above, a combination of a pattern roll 1 with an anvil roll 2 having large numbers of recesses 2a on the rolling surface can form a high-moisture-permeability, microporous plastic film F' randomly having large numbers of dents Fa having different opening diameters and depths, the dents Fa having rupture openings Fb, the dents Fa having an opening diameter distribution in a range of 60-300 μm and a depth distribution in a range of 8-100 μm, 50% or more of the rupture openings Fb being formed in boundary regions between bottom portions and side portions of the dents Fa, whereby the microporous plastic film F' has moisture permeability of 100-7000 g/m$^2$·24 hr at 40° C. and 90% RH.

(5) Driving Mechanism of Pattern Roll and Anvil Roll

As shown in FIGS. 2 and 4, the second and third driving means 13, 23 for moving the pattern roll 1 and the anvil roll 2 comprises a driving mechanism 5 comprising a motor 51, a reduction gear 53 connected to a rotation shaft of the motor 51 via a coupling unit 52, a transmission 55 connected to a rotation shaft of the reduction gear 53 via a coupling unit 54, a sprocket 56 connected to the transmission 55, a sprocket 58 engaging the sprocket 56 via a chain 57, and a gear unit 59 engaging the sprocket 58. Because two rotation shafts 61, 62 extending from the gear unit 59 are connected to gears having the same number of teeth and engaging each other, they are rotated at the same speed n. One rotation shaft 61 of the gear unit 59 is connected to a second driving means 13 via a coupling unit 63, and the other rotation shaft 62 is connected to a third driving means 23 via a universal joint 64.

The rotation shaft 61 of the second driving means 13 rotated by the driving mechanism 5 at a rotation speed n is connected to one shaft of the pattern roll 1 rotatably supported by bearings 10a, 10a fixed to a pair of the first stationary frame portions 11a, 11a. The rotation shaft 62 of the third driving means 23 rotated at the same rotation speed n is connected to one shaft of the anvil roll 2 via a universal joint 64, such that the anvil roll 2 can be moved up and down by a pair of the fourth driving means 24, 24.

(6) Strain-Removing Roll

Because strain is generated in a plastic film provided with large numbers of fine pores (microporous plastic film) F' passing through a gap G between the pattern roll 1 and the anvil roll 2 relatively inclined to each other, troubles such as rupture, etc. may occur in the microporous plastic film F' when wound up as it is. Accordingly, a strain-removing roll 8 is preferably disposed immediately downstream of the gap G between the pattern roll 1 and the anvil roll 2 as shown in FIG. 3. As shown in FIGS. 6 and 9, bearing 8a, 8a rotatably supporting both ends of the strain-removing roll 8 are mounted to fifth driving means (for example, motors, air cylinders or hydraulic cylinders) 18, 18 fixed to a pair of the first stationary frame portions 11a, 11a. Accordingly, the heights of both ends of the strain-removing roll 8 can be changed by independently operating the fifth driving means 18, 18. Namely, the strain-removing roll 8 can be inclined at a desired angle relative to the horizon (parallel to the center axis of the pattern roll 1).

Because a pair of nip rolls 9, 9 are disposed downstream of the strain-removing roll 8, the microporous plastic film F' is subjected to laterally different tension by the inclined strain-removing roll 8 between the gap G and the nip rolls 9, 9, resulting in reduced strain. For example, when the anvil roll 2 is inclined such that a left side of the microporous plastic film F' moves more forward than a right side, a left end of the strain-removing roll 8 is made higher than a right end by adjusting the strokes of a pair of the fifth driving means 18, 18, to sufficiently remove strain from the microporous plastic film F' provided with fine pores by the pattern roll 1 and the anvil roll 2 relatively inclined to each other, resulting in less likelihood of troubles such as rupture, wrinkling, etc. during a winding step.

[2] Second Embodiment

Because the apparatus in the second embodiment has basically the same structure as that of the apparatus in the first embodiment except for a backup roll, the same reference numerals are assigned to common members, and explanation will be omitted except for the backup roll.

Figure 20:
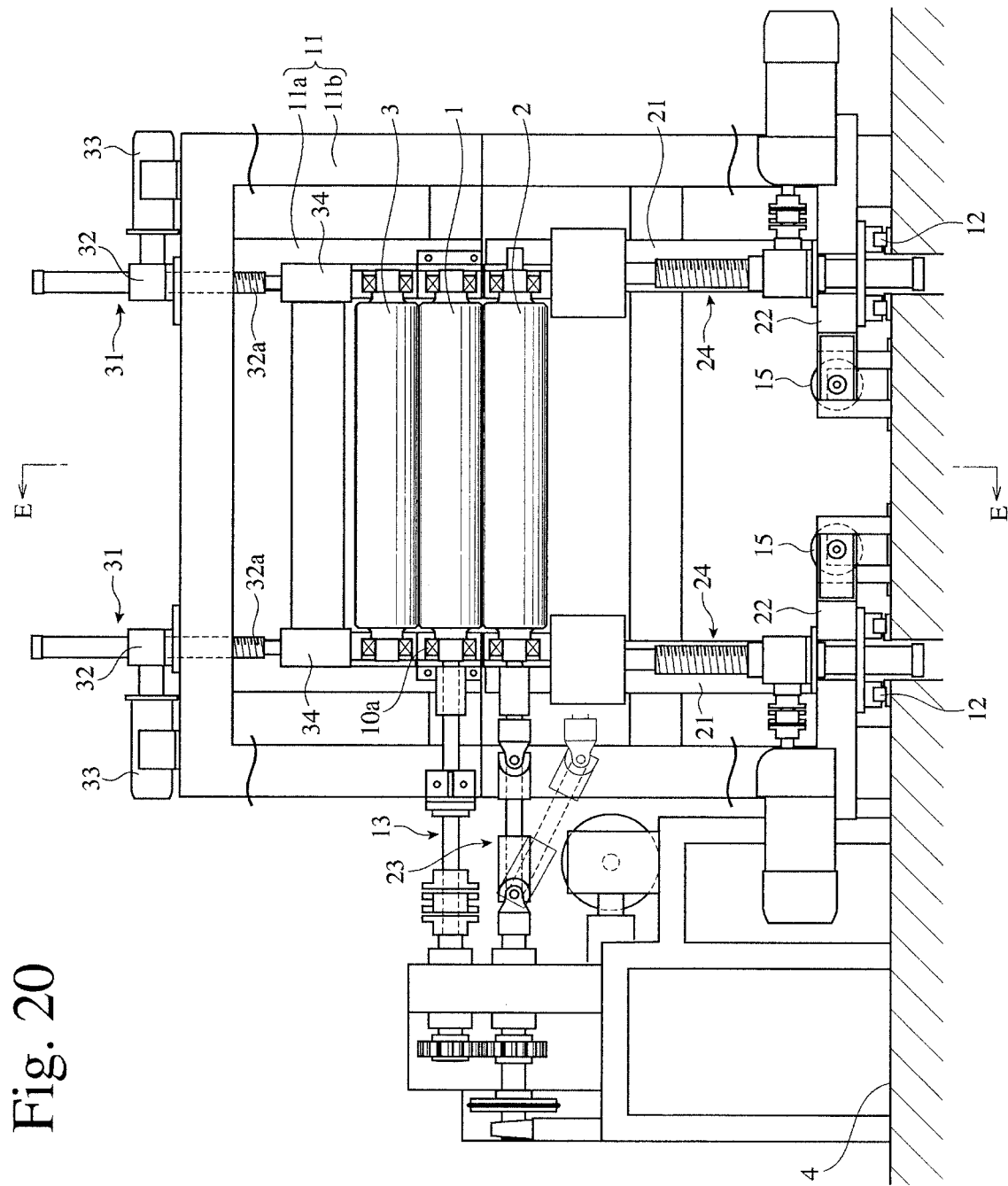
FIG. 20 is a front view showing the production apparatus of a microporous plastic film according to the second embodiment of the present invention, with a reduced gap between a pattern roll and an anvil roll.
Figure 21:
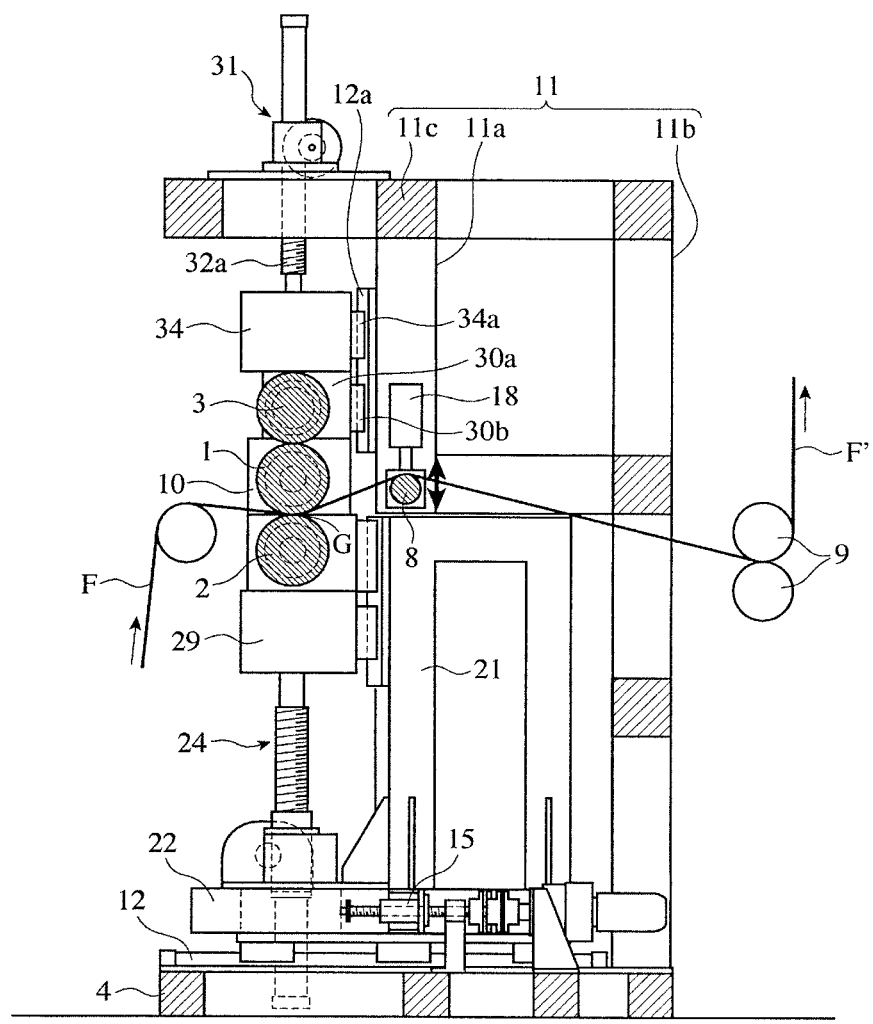
FIG. 21 is a cross-sectional view taken along the line E-E in FIG. 20.

As shown in FIGS. 20 and 21, the apparatus in the second embodiment comprises a backup roll 3 above the pattern roll 1, to reduce the bending of the pattern roll 1 when forming fine pores. The backup roll 3 is driven by a pair of sixth driving means 31, 31 mounted to the third stationary frame portion 11c to push the pattern roll 1 from above. The backup roll 3 coming into contact with the pattern roll 1 having high-hardness, fine particles on the rolling surface is preferably a roll having a relatively elastic rolling surface, such as a rubber roll, etc.

Each sixth driving means 31 comprises a screw jack 32 mounted to the third stationary frame portion 11c, a motor 33 for driving the screw jack 32, and a resilient unit 34 attached to a lower end of a male screw member 32a of the screw jack 32 for pushing each bearing 10a of the pattern roll 1. The resilient unit 34 comprises a resilient member such as a coil spring, etc., to prevent excessive shock from being applied to the bearing 10a of the pattern roll 1.

Figure 22:
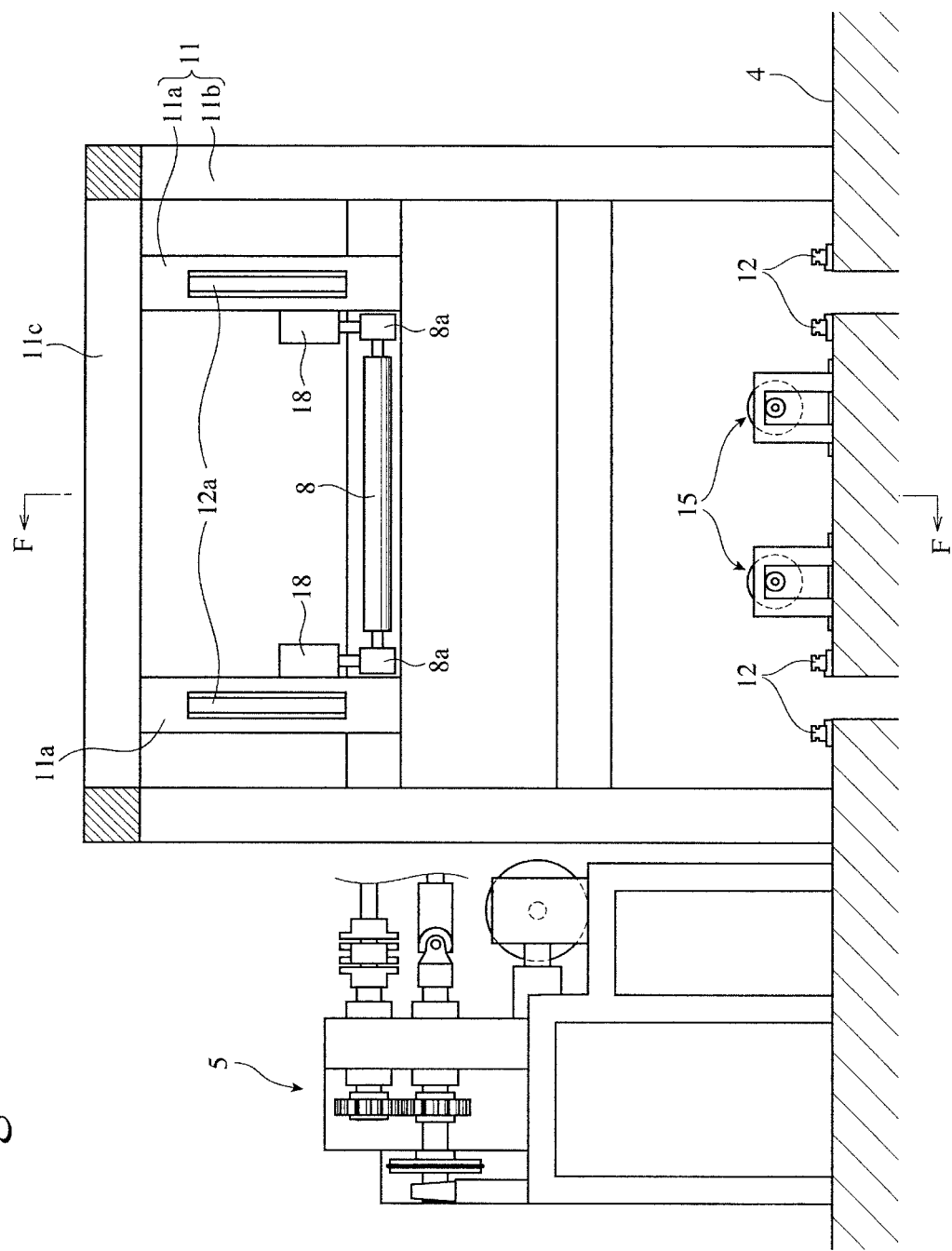
FIG. 22 is a partially cross-sectional front view showing a base, a stationary frame, first driving means, and a driving mechanism connected to second and third driving means, which constitute the production apparatus of a microporous plastic film according to the second embodiment of the present invention.
Figure 23:
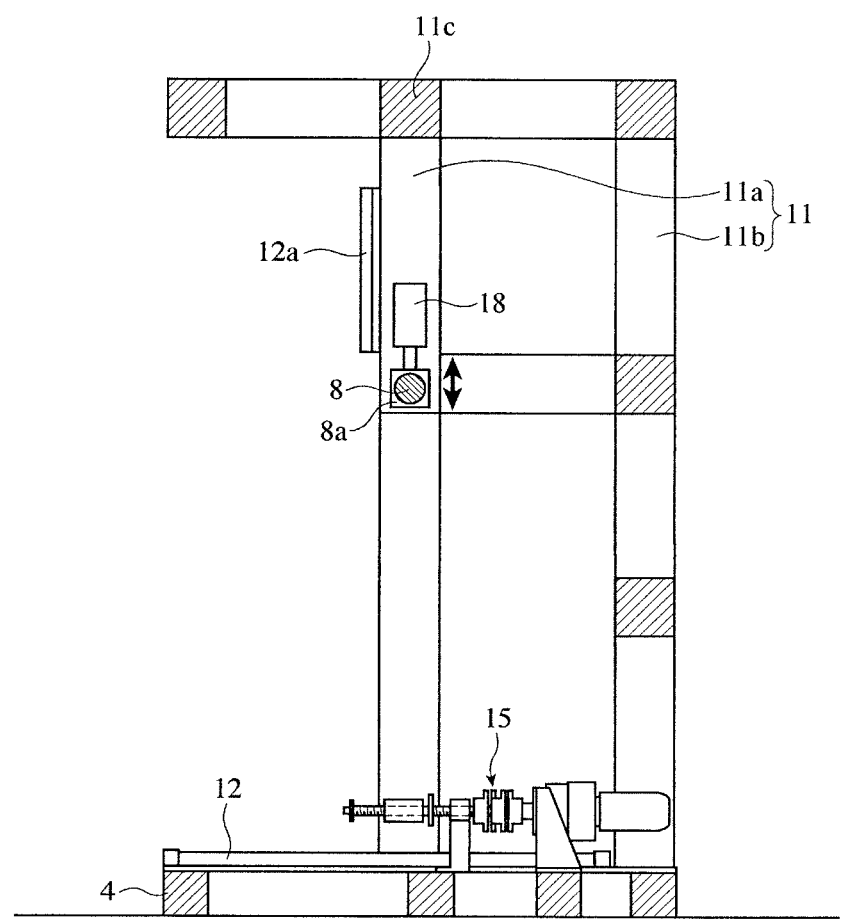
FIG. 23 is a cross-sectional view taken along the line F-F in FIG. 22.
Figure 24:
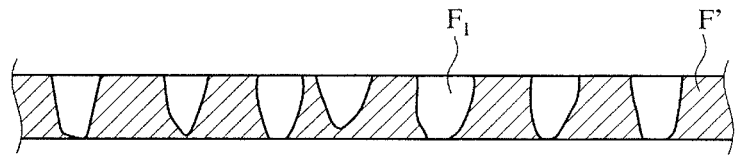
FIG. 24 is an enlarged, partial cross-sectional view showing a microporous plastic film produced by a combination of a pattern roll and an anvil roll having a flat rolling surface.

A vertical rail 12a is attached to each first stationary frame portion 11a as shown in FIGS. 22 and 23, and a guide member 30b fixed to each bearing 30a of the backup roll 3 is vertically movable along the rail 12a as shown in FIG. 21. When the male screw member 32a of the screw jack 32 is moved downward by the motor 33, the bearing 30a of the backup roll 3 is pushed downward via the resilient unit 34. As a result, the backup roll 3 pushes the pattern roll 1 downward to reduce the bending of the pattern roll 1 when forming fine pores. Because a relative inclination angle of the pattern roll 1 and the anvil roll 2 can be made smaller by reducing the bending of the pattern roll 1, strain generated in the microporous plastic film F' can be advantageously reduced.

[3] Production of Microporous Plastic Film (1) Plastic Film

A plastic film F, in which fine pores are formed by the pore-forming apparatus of the present invention, should have softness enabling the formation of fine pores by the high-hardness, fine particles 1b of the pattern roll 1, and such high strength and hardness as to avoid troubles such as rupture, wrinkling, etc. when passing through a gap G between the pattern roll 1 and the anvil roll 2 relatively inclined to each other. Such plastics are preferably flexible thermoplastic polymers, which include polyesters such as polyethylene terephthalate (PET), polybutylene terephthalate (PBT), etc.; polyolefins such as oriented polypropylene (OPP), etc.; polyamides such as nylons (Ny), etc.; polyvinyl chlorides; polyvinylidene chlorides; polystyrenes; etc.

The plastic film F for microporous films for wrapping breads, cookies, vegetables, fermented foods such as fermented soybeans and kimchi, etc. preferably has thickness in a range of 8-100 μm. When the thickness of the plastic film F is less than 8 μm, it does not have sufficient strength for a wrapping film. On the other hand, when the thickness of the plastic film F is more than 100 μm, it is too hard for a wrapping film. The thickness of the plastic film F is more preferably 10-80 μm, most preferably 20-60 μm.

The plastic film F may be a single-layer film or a laminate film. Particularly when heat sealing is conducted, it preferably has a sealant layer of a low-melting-point resin such as LLDPE and EVAc as an inner layer. The sealant layer may be as thick as about 20-60 μm.

(2) Forming Pores in Plastic Film

With a plastic film F passing through a large gap G between the pattern roll 1 and the anvil roll 2 in the pore-forming apparatus in a state shown in FIG. 2(b), the fourth driving means 24, 24 are operated to move the anvil roll 2 upward to a state shown in FIG. 2(a), in which fine pores are formed in the plastic film F. Because the pattern roll 1 and the anvil roll 2 are pressed to each other via the plastic film F while they are in parallel, the gap G becomes larger in a lateral center portion than in side portions by the deformation of the rolls. Thus, fine pores formed by such an uneven gap G have different opening diameters and depths between the lateral center portion and the side portions, failing to obtain a microporous plastic film F' having uniform gas permeability.

Figure 1A:
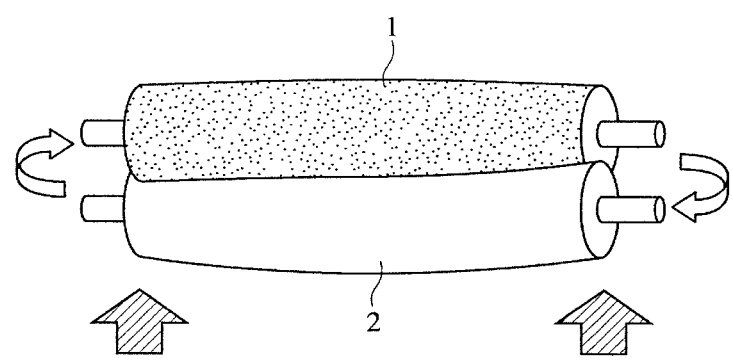
FIG. 1(a) is a perspective view showing a pattern roll and an anvil roll relatively inclined to each other.
Figure 1B:
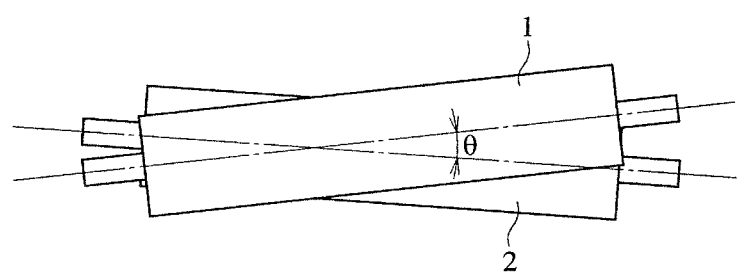
FIG. 1(b) is a plan view showing a pattern roll and an anvil roll relatively inclined to each other.

To solve this problem, the pattern roll 1 and the anvil roll 2 are relatively inclined to each other in the present invention as shown in FIG. 1, such that the pattern roll 1 and the anvil roll 2 both slightly bent are in helically linear contact with each other. As a result, laterally uniform fine pores can be formed in the plastic film F.

To incline the anvil roll 2 relatively to the pattern roll 1 by a desired angle θ, as shown in FIG. 8(b), one first driving means 15 is operated to move one carriage 22 forward or rearward along the rail 12 by a desired distance ΔL. Of course, to separate the carriages 22, 22 from each other by the desired distance ΔL, both carriages 22, 22 may be moved in opposite directions.

When the motor 51 in the driving mechanism 5 is operated, the rotation shafts 61, 62 are rotated at the same speed n via the reduction gear 53, the transmission 55, the chain 57 engaging the sprockets 56, 58 and the gear unit 59, so that the pattern roll 1 and the anvil roll 2 are rotated at the same speed n in opposite directions. A plastic film F passing through a uniform helical gap G between the pattern roll 1 and the anvil roll 2 is provided with fine pores uniformly in a width direction.

Because strain is generated in a microporous plastic film F' exiting from a helical gap G between the pattern roll 1 and the anvil roll 2, the heights of both ends of the strain-removing roll 8 are changed by a pair of the fifth driving means 18, 18 fixed to a pair of first stationary frame portions 11a, 11a, to remove strain from the microporous plastic film F'. When the anvil roll 2 is inclined such that the plastic film F moves more forward on the left side than on the right side, a pair of the fifth driving means 18, 18 are operated to incline the strain-removing roll 8 higher on the left end than on the right end.

Though the pattern roll 1 is mounted to the stationary frame 11, with the anvil roll 2 mounted to the movable frame 21, in the above embodiments, this arrangement is not restrictive, but the pattern roll 1 may be oppositely mounted to the movable frame 21, with the anvil roll 2 mounted to the stationary frame 11. Accordingly, the inclined roll is not restricted to the anvil roll 2, but may be the pattern roll 1. Also, the carriage 22 is movable on the base 4 in the above embodiments, the carriage 22 may be movable along the third stationary frame portion of the stationary frame 11.

[4] Microporous Plastic Film (1) Anvil Roll Having Flat Rolling Surface

Because extremely small fine pores $F_1$ are formed in the plastic film F, the microporous plastic film F' is not substantially deformed. The microporous plastic film F' produced by the apparatus of the present invention has remarkably uniform gas permeability in a width direction.

(2) Anvil Roll Having Recesses on a Rolling Surface

Figure 16A:
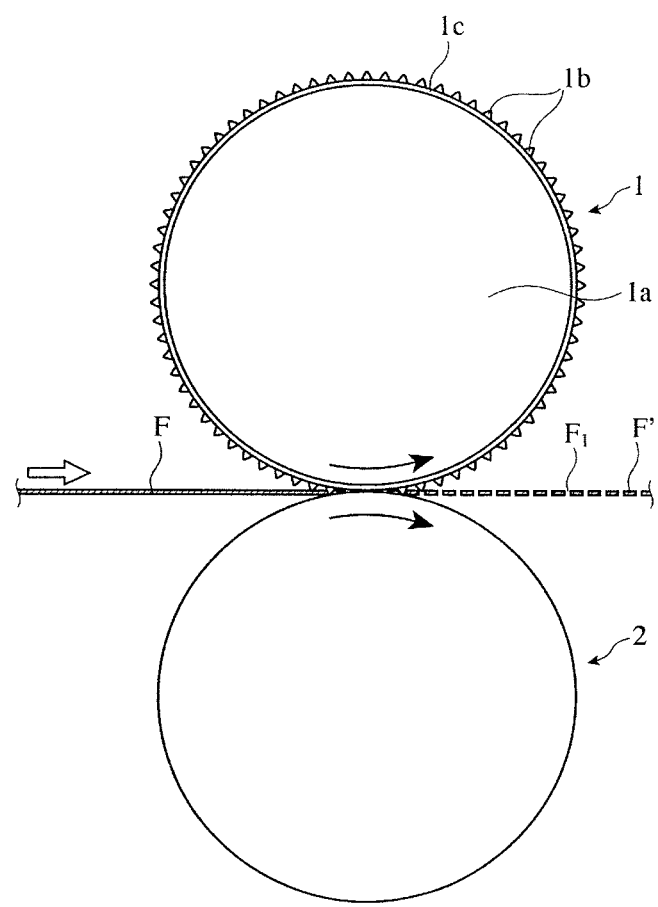
FIG. 16(a) is a schematic cross-sectional view showing the formation of fine pores in a plastic film by a combination of a pattern roll and an anvil roll having a flat rolling surface.
Figure 16B:
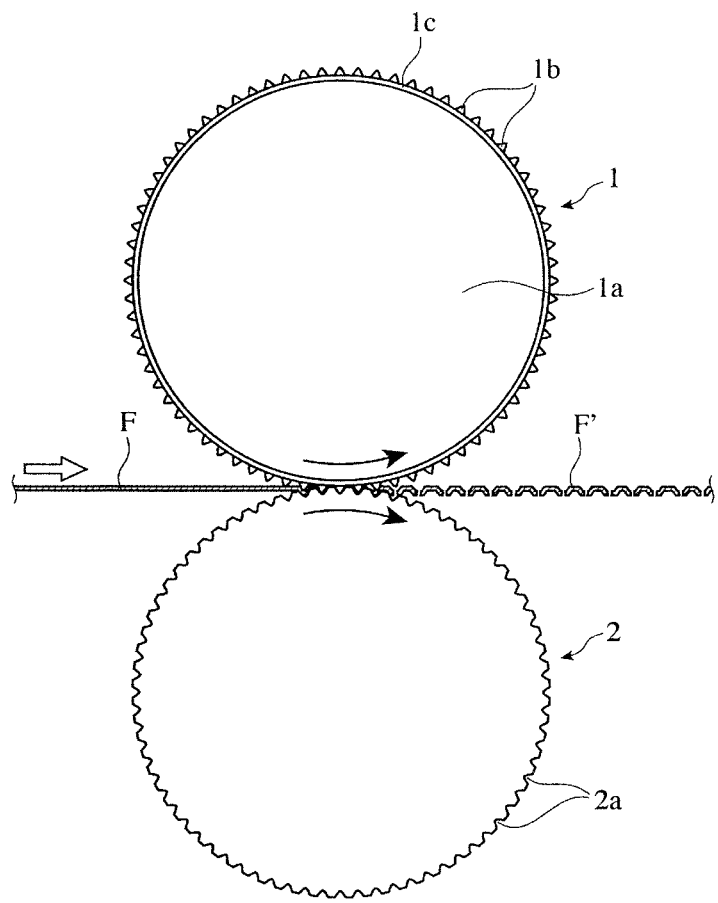
FIG. 16(b) is a schematic cross-sectional view showing the formation of fine pores in a plastic film by a combination of a pattern roll and an anvil roll having recesses on the rolling surface.
Figure 17:
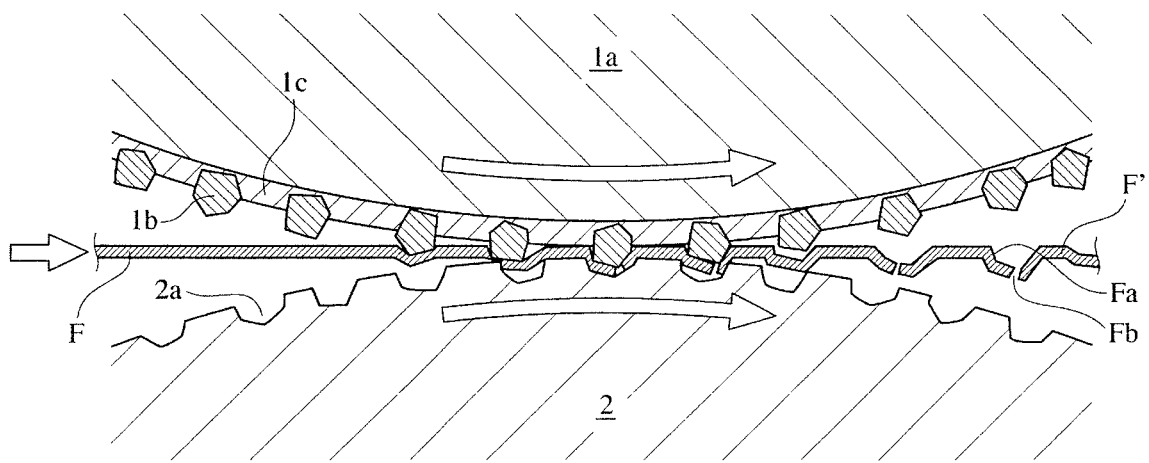
FIG. 17 is an enlarged, partial cross-sectional view showing in detail the formation of fine pores in a plastic film by a combination of a pattern roll and an anvil roll having recesses on the rolling surface.
Figure 18:
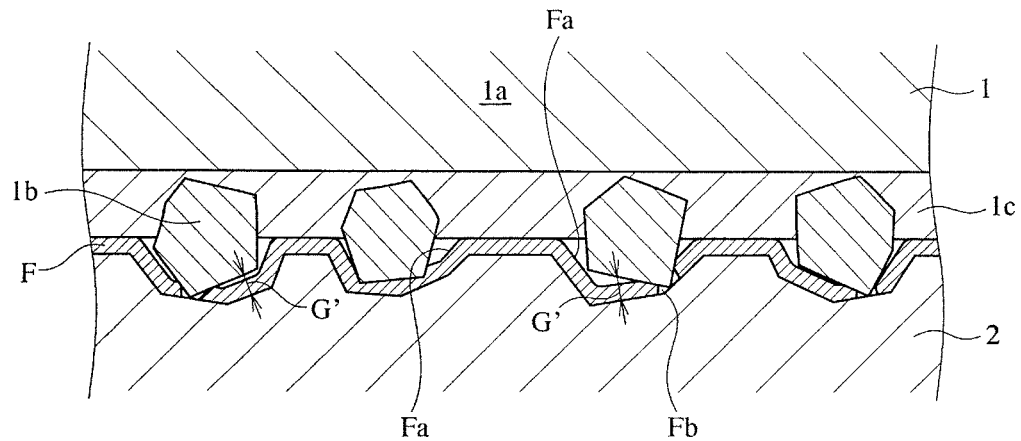
FIG. 18 is an enlarged, partial cross-sectional view of FIG. 17.

As shown in FIGS. 16 and 17, when a plastic film F passes through a desirably set gap G between the pattern roll 1 and the anvil roll 2 having recesses 2a on the rolling surface, the plastic film F is plastically deformed by high-hardness, fine particles 1b and pressed into the recesses 2a of the anvil roll 2. Partially expanded in narrow gaps G between the high-hardness, fine particles 1b and the recesses 2a, the plastic film F is deformed along the recesses 2a, and the resultant dents Fa are provided with cut openings (rupture openings) 11b. The rupture openings Fb are formed mainly in periphery bottom portions (boundary regions between bottom portions and side portions) of the dents Fa, though not restrictive. The rupture openings Fb may also be formed in other portions, depending on the shapes of the high-hardness, fine particles 1b and the recesses 2a.

The number and size of dents Fa (rupture openings Fb) formed in the plastic film F increase as a pushing force applied to the plastic film F by the pattern roll 1 and the anvil roll 2 becomes higher. A pushing force applied to the plastic film F is preferably 0.002-1.47 kN/cm (0.2-150 kgf/cm) by linear pressure. When the linear pressure is less than 0.002 kN/cm (0.2 kgf/cm), dents Fa (rupture openings Fb) cannot be formed in sufficient number and size, failing to obtain desired moisture permeability. On the other hand, when the pushing force is more than 1.47 kN/cm (150 kgf/cm), too large dents Fa (rupture openings Fb) are formed. The pushing force is more preferably 0.01-0.98 kN/cm (1-100 kgf/cm).

Figure 25:
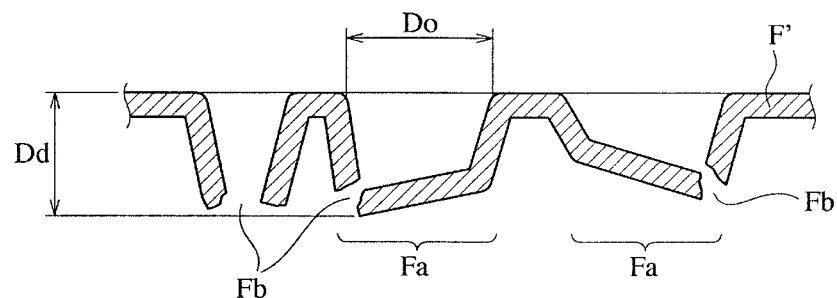
FIG. 25 is an enlarged, partial cross-sectional view showing a microporous plastic film produced by a combination of a pattern roll and an anvil roll having recesses on the rolling surface.
Figure 26A:
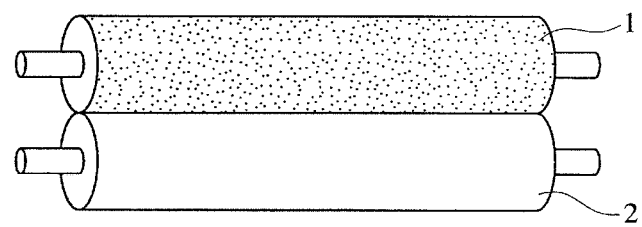
FIG. 26(a) and FIG. 26(b) is a schematic view showing the bending of a pattern roll and an anvil roll when forming fine pores in a plastic film.
Figure 26B:
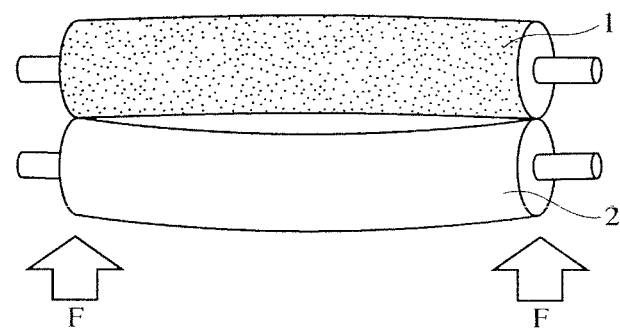

As shown in FIG. 25, the resultant microporous plastic film F' is randomly provided with large numbers of dents Fa having different opening diameters Do and depths Dd, and the dents Fa are provided with rupture openings Fb. The dents Fa have an opening diameter distribution in a range of 60-300 µm and a depth distribution in a range of 8-100 µm. When the dents Fa have opening diameters of less than 60 µm or depths of less than 8 µm, rupture openings Fb are not formed in sufficient number and size. On the other hand, when the dents Fa have opening diameters of more than 300 µm or depths of more than 100 µm, too large dents Fa are formed, with too large rupture openings Fb. The lower limit of the opening diameters Dod of dents Fa is preferably 70 µm, more preferably 80 µm. The upper limit of the opening diameters Dod of dents Fa is preferably 250 µm, more preferably 200 µm. The lower limit of the depths Dd of dents Fa is preferably 10 µm, more preferably 20 µm. The upper limit of the depths Dd of dents Fa is preferably 80 µm, more preferably 70 µm.

For the same reasons as above, the microporous plastic film F' preferably has an average opening diameter Doav of 100-240 µm and an average depth Dav of 20-80 µm. The lower limit of the average opening diameter Doav of dents Fa is more preferably 110 µm, most preferably 120 µm. The upper limit of the average opening diameter Doav of dents Fa is more preferably 200 µm, most preferably 180 µm. The lower limit of the average depth Dav of dents Fa is more preferably 30 µm, most preferably 35 µm. The upper limit of the average depth Dav of dents Fa is more preferably 70 µm, most preferably 60 µm.

At least 30% of the dents Fa are preferably provided with rupture openings Fb. When the percentage of dents Fa having rupture openings Fb to all dents Fa is less than 30%, rupture openings Fb are too few relative to the dents Fa, failing to obtain desired moisture permeability. The percentage of dents Fa having rupture openings Fb is preferably at least 40%, more preferably at least 50%.

Most (50% or more) of rupture openings Fb are formed in boundary regions between bottom portions and side portions of the dents Fa, presumably because a plastic film F expanded by high-hardness, fine particles 1b is ruptured mainly in boundary regions between bottom portions and side portions of the dents Fa. Of course, ruptured portions of the plastic film F may vary depending on combinations of shapes and sizes of the high-hardness, fine particles 1b of the pattern roll 1 and the recesses 2a of the anvil roll 2. Rupture openings Fb may also be formed in other regions than the boundary regions between bottom portions and side portions of the dents Fa.

The sizes of rupture openings Fb may also vary depending on combinations of shapes and sizes of the high-hardness, fine particles 1b and the recesses 2a. Further, as a pushing force applied to the plastic film F by the pattern roll 1 and the anvil roll 2 increases, dents Fa become larger with larger number, and rupture openings Fb also become larger with larger number. Accordingly, the size and number of rupture openings Fb can be adjusted by a pushing force applied to the plastic film F by the pattern roll 1 and the anvil roll 2.

The microporous plastic film F' of the present invention has moisture permeability of 100-7000 $g/m^2 \cdot 24$ hr at 40° C. and 90% RH. The moisture permeability is measured by "Testing Methods for Determination of Water Vapor Transmission Rate of Moisture-Proof Packaging Materials" of JIS Z 0208. The size and number of rupture openings Fb can be controlled by adjusting a pushing force applied to the plastic film F by the pattern roll 1 and the anvil roll 2, thereby properly setting the moisture permeability of the microporous plastic film F' in a range of 100-7000 $g/m^2 \cdot 24$ hr at 40° C. and 90% RH. When the moisture permeability is less than 100 $g/m^2 \cdot 24$ hr at 40° C. and 90% RH, the microporous plastic film F' does not have necessary moisture permeability for foods such as breads, vegetables, etc. On the other hand, when the moisture permeability is more than 7000 $g/m^2 \cdot 24$ hr at 40° C. and 90% RH, the microporous plastic film F' has too high moisture permeability. The moisture permeability of the microporous plastic film F' is preferably 200-6000 $g/m^2 \cdot 24$ hr at 40° C. and 90% RH, more preferably 300-6000 $g/m^2 \cdot 24$ hr at 40° C. and 90% RH. The moisture permeability of the microporous plastic film F' may be properly selected within the above range depending on contents to be wrapped.

Of course, in a case where the anvil roll having recesses on the rolling surface 2 is used, too, the microporous plastic film F' has moisture permeability and gas (air) permeability extremely uniform in a width direction.

Effects of the Invention

Because one of the pattern roll and the anvil roll is rotatably supported by a stationary frame, and the other is rotatably supported by movable frames, the movable frames being movable relative to the stationary frame, in the apparatus of the present invention, an extremely small inclination angle between the center axis of the pattern roll and the center axis of the anvil roll can be precisely controlled, thereby uniformly forming fine pores having various opening diameters, depths and area ratios in a plastic film in a width direction. A microporous plastic film produced by the apparatus of the present invention is suitable for films for wrapping foods such as breads, cookies, vegetables, fermented foods such as fermented soybeans and kimchi, etc., which require proper gas permeability and moisture permeability.

DESCRIPTION OF REFERENCE NUMERALS

1: Pattern roll
1a: Roll body of pattern roll
1b: High-hardness, fine particles
1c: Plating layer
10a: Bearing of pattern roll
11: Stationary frame
11a: First stationary frame portion
11b: Second stationary frame portion
11c: Third stationary frame portion
12: Rail fixed to base
12a: Rail fixed to first stationary frame portion
2: Anvil roll
2a: Recess of anvil roll
2b: Guide member of anvil roll
20a: Bearing
20b: Bearing box
21: Movable frame 21a: Rail fixed to movable frame
22: Carriage
22a: Opening of carriage
25: Guide member of carriage
3: Backup roll
30a: Bearing of backup roll
30b: Guide member fixed to bearing of backup roll
4: Base
5: Driving mechanism connected to second and third driving means
51: Motor
52, 54, 63: Coupling unit
53: Reduction gear
55: Transmission
56, 58: Sprocket
57: Chain
59: Gear unit
61, 62: Rotation shaft of gear unit
64: Universal joint
6: Metal roll
7: Dent-forming pattern roll
7a: Roll body
7b: High-hardness, fine particles
7c: Plating layer
8: Strain-removing roll
8a: Bearing of strain-removing roll
18: Fifth driving means
9: Nip roll
15: First driving means
151: Motor
152: Reduction gear
153: Coupling unit
154: Male screw member
155: Female screw member
13: Second driving means
23: Third driving means
24: Fourth driving means
26: Screw jack
26a: Male screw member
27: Link mechanism
28: Motor
29: Resilient unit
29a: Guide member of resilient unit
31: Sixth driving means
32: Screw jack
32a: Male screw member of screw jack
33: Motor for driving screw jack
34: Resilient unit
F: Plastic film
F': Microporous plastic film
$F_1$: Fine pore
Fa: Dent
Fb: Rupture opening
G: Gap between pattern roll and anvil roll
G': Gap between high-hardness, fine particle and recess

What is claimed is:

1. An apparatus for producing a microporous plastic film comprising
a horizontal pattern roll randomly having pluralities of high-hardness, fine particles having sharp edges on a rolling surface of a roll body;
an anvil roll arranged opposite to said pattern roll;
a conveying means for passing a plastic film through a gap between said pattern roll and said anvil roll;
a stationary frame rotatably supporting either one of said pattern roll and said anvil roll;
a pair of laterally arranged movable frames for rotatably supporting the other of said pattern roll and said anvil roll, said movable frames comprising vertical rails along which the other of said pattern roll and said anvil roll moves up and down;
a pair of laterally arranged carriages, to each of which each of said movable frames is fixed; and
a pair of rails extending in a running direction of said plastic film;
said carriages comprising guide members engaging said rails, so that at least one of said carriages is independently movable back and forth along said rails in a running direction of the plastic film, to generate positional difference between a pair of said laterally arranged movable frames in a running direction of said plastic film, so that a center axis of said pattern roll and a center axis of said anvil roll are relatively inclined to each other;
said apparatus further comprising a strain-removing roll brought into contact with a perforated plastic film, and a pair of driving means for changing the heights of bearings rotatably supporting both ends of said strain-removing roll, at a position downstream of a gap between said pattern roll and said anvil roll; and
at least one of said driving means being operated to move at least one end of said strain-removing roll up and down, thereby vertically inclining said strain-removing roll relative to the center axis of said horizontal pattern roll, to absorb strain generated in said perforated plastic film by the inclination of the center axis of said anvil roll to the center axis of said pattern roll.

2. The apparatus for producing a microporous plastic film according to claim 1, wherein
said pattern roll is rotatably supported by said stationary frame; and
said anvil roll is rotatably supported by a pair of said laterally arranged movable frames.

3. The apparatus for producing a microporous plastic film according to claim 2, wherein said apparatus comprises
a pair of first driving means for moving said carriages independently;
a second driving means for rotating said pattern roll;
a third driving means for rotating said anvil roll; and
a pair of fourth driving means mounted to each of said carriages for moving said anvil roll along said movable frame up and down.

4. The apparatus for producing a microporous plastic film according to claim 3, wherein said second and third driving means are driven by one motor via gears having the same number of teeth, thereby rotating said pattern roll and said anvil roll at the same rotation speed.

5. The apparatus for producing a microporous plastic film according to claim 1, wherein;
at least one of said driving means being operated to move at least one end of said strain-removing roll up and down, thereby vertically inclining said strain-removing roll relative to said perforated plastic film, to absorb strain generated in said perforated plastic film by the inclination of the center axis of said anvil roll to the center axis of said pattern roll.

6. The apparatus for producing a microporous plastic film according to claim 1, wherein said high-hardness, fine particles have Mohs hardness of 5 or more.

7. The apparatus for producing a microporous plastic film according to claim 1, wherein an area ratio of said high-hardness, fine particles on a rolling surface of said pattern roll is 10-70%.

8. The apparatus for producing a microporous plastic film according to claim 1, wherein said anvil roll is a metal roll having a flat rolling surface, or a metal roll randomly having on its rolling surface pluralities of recesses having an opening diameter distribution and a depth distribution corresponding to those of said high-hardness, fine particles.

9. The apparatus for producing a microporous plastic film according to claim 8, wherein
said anvil roll is a metal roll randomly having on its rolling surface pluralities of recesses having an opening diameter distribution and a depth distribution corresponding to those of said high-hardness, fine particles; an area ratio of said recesses on a rolling surface of said anvil roll being 10-70%.

10. The apparatus for producing a microporous plastic film according to claim 1, wherein said apparatus further comprises a means for adjusting a gap between said pattern roll and said anvil roll, so that a pushing force to said plastic film is adjusted in a range of 0.002-1.47 kN/cm (0.2-150 kgf/cm) by linear pressure.

\* \* \* \* \*